US010607132B1

(12) United States Patent
Dietz et al.

(10) Patent No.: US 10,607,132 B1
(45) Date of Patent: Mar. 31, 2020

(54) TECHNIQUES FOR MANAGING DEVICE INTERACTIONS IN A WORKSPACE

(71) Applicant: Amazon Technologies, Inc., Seattle, WA (US)

(72) Inventors: Timothy G. Dietz, Redding, MA (US); Ashish Shah, Lincoln, MA (US); Gregory Tierney, Chelmsford, MA (US); Seth R. Kaufman, Arlington, MA (US); Matthew Anthony Brady, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/360,989

(22) Filed: Mar. 21, 2019

(51) Int. Cl.
*G06K 19/077* (2006.01)
*G06F 3/01* (2006.01)
*H04W 4/029* (2018.01)
*H04W 4/35* (2018.01)
*G08B 7/06* (2006.01)
*G06Q 10/08* (2012.01)

(52) U.S. Cl.
CPC ....... *G06K 19/07762* (2013.01); *G06F 3/016* (2013.01); *G08B 7/06* (2013.01); *H04W 4/029* (2018.02); *H04W 4/35* (2018.02); *G06Q 10/087* (2013.01)

(58) Field of Classification Search
None
See application file for complete search history.

(56) References Cited

U.S. PATENT DOCUMENTS

| 5,382,948 | A | * | 1/1995 | Richmond | B60R 25/04 180/287 |
| 8,280,547 | B2 | | 10/2012 | D'Andrea et al. | |
| 8,884,739 | B2 | * | 11/2014 | Shimomura | B60R 25/403 340/5.62 |
| 9,087,314 | B2 | | 7/2015 | Hoffman et al. | |
| 9,104,271 | B1 | * | 8/2015 | Adams | G06F 3/0426 |
| 10,387,032 | B2 | * | 8/2019 | Lane | G06F 3/04883 |
| 10,419,886 | B2 | * | 9/2019 | Yang | G06F 1/163 |
| 2010/0096490 | A1 | * | 4/2010 | Gordon | B64C 27/10 244/2 |
| 2012/0151339 | A1 | * | 6/2012 | Zhang | G06F 3/016 715/702 |

(Continued)

*Primary Examiner* — Fekadeselassie Girma
(74) *Attorney, Agent, or Firm* — Kilpatrick Townsend & Stockton LLP

(57) ABSTRACT

Techniques for managing device interaction between components of an inventory management system are described herein. User input associated with an operational state of the user device may be received at the user device and the user device may begin operating in a particular operational state. While operating in this state, the user device may transmit a wireless signal having a predetermined frequency. A mobile drive unit of the system, upon receipt of the wireless signal, may slow or stop. Operational state information may be transmitted to other components of the inventory management system indicating that the wireless signal is being transmitted and/or that the user device is operating in a particular operational state and a fault detection process may commence. The user device may provide an indication (e.g., via visual, audible, and/or haptic feedback devices) that the user device is operating in the particular operational state.

20 Claims, 10 Drawing Sheets

(56) References Cited

U.S. PATENT DOCUMENTS

| | | | |
|---|---|---|---|
| 2013/0302132 A1* | 11/2013 | D'Andrea | G06Q 10/08 |
| | | | 414/807 |
| 2013/0304253 A1* | 11/2013 | Wurman | G06Q 10/08 |
| | | | 700/214 |
| 2013/0314503 A1* | 11/2013 | Nix | G06K 9/00805 |
| | | | 348/46 |
| 2014/0070934 A1* | 3/2014 | Chau | B60R 1/00 |
| | | | 340/438 |
| 2017/0334696 A1* | 11/2017 | Otto | B66F 9/07504 |
| 2018/0039402 A1* | 2/2018 | Lane | G06F 1/1626 |
| 2019/0013960 A1* | 1/2019 | Sadwick | G08C 23/04 |
| 2019/0089193 A1* | 3/2019 | Ranjan | G09G 5/14 |
| 2019/0196488 A1* | 6/2019 | Holmberg | G05D 1/0225 |
| 2019/0226266 A1* | 7/2019 | Eslami | E05F 15/76 |

* cited by examiner

TECHNIQUES FOR MANAGING DEVICE INTERACTIONS IN A WORKSPACE

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space, and equipment, can result in lower throughput, unacceptably long response times, and, in general, poor system performance. Particular inefficiencies may arise when dealing with an automated or semi-automated inventory system with respect to managing interactions between autonomous or semi-autonomous components and other components of the system.

BRIEF DESCRIPTION OF THE DRAWINGS

Various embodiments in accordance with the present disclosure will be described with reference to the drawings, in which.

DETAILED DESCRIPTION

Figure 1:
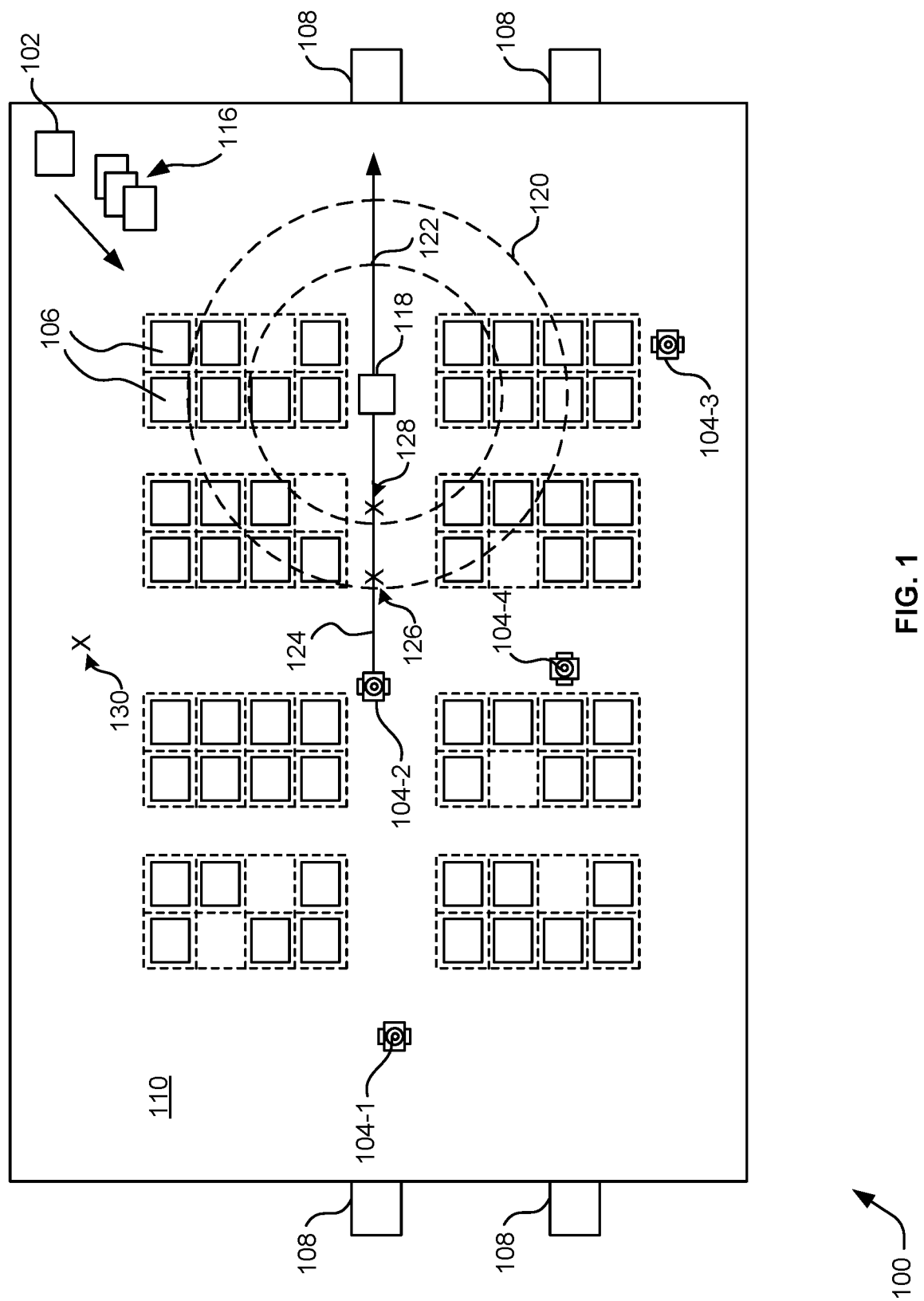
FIG. 1 is a schematic diagram illustrating an example environment suitable for implementing aspects of an inventory management system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order so as not to obscure the embodiment being described. Although examples may be provided which include an inventory system and/or workspace, it should be appreciated that the same techniques may be applied in a variety of contexts such as mail order warehouses, supply chain distribution centers, airport luggage systems, grocery stores, and custom-order manufacturing facilities, to name a few.

Embodiments herein are directed to an inventory management system having multiple storage containers and mobile drive units (MDUs) for moving the storage containers and other items within a workspace managed by the inventory management system. As used herein, a "mobile drive unit" (MDU) may include any suitable autonomous guided vehicle, or other suitable automated or semi-automated vehicle associated with an inventory management system. A variety of user devices (e.g., handheld devices, wearable devices, etc.) may be utilized within the inventory management system and a variety of interactions may occur between components of the inventory management system. Specifically, systems and methods are provided for managing these device interactions.

In at least one embodiment, the inventory management system may include a workspace management module that may be configured to determine tasks and assign individual tasks to individual MDUs within a storage and/or sortation facility operated by, or on behalf of an electronic marketplace provider (e.g., an online retailer of physical items). For example, the workspace management module may determine that an item (e.g., a single item, a pallet, a cart, or any suitable container that stores one or more items) is to be moved from a first location (e.g., a receiving workstation) to a second location (e.g., a designated storage location within a storage facility, a destination location within a sortation facility, etc.). The workspace management module may determine a storage and/or destination location for the item based on any suitable techniques. In at least one embodiment, the workspace management module may select a particular MDU to perform the task based at least in part on any suitable data associated with the MDU (e.g., current state, location, device type, etc.) and/or any suitable data associated with the task (e.g., source location, destination location, priority, an item or item attributes of an item, etc.). The workspace management module (or individual components/agents of the workspace management module associated with individual MDUs) may generate a set of commands that instruct the MDU to perform a task (e.g., retrieve the item from the first location and deliver it to the second location). In some embodiments, the workspace management module may generate and incrementally provide the set of commands to the tasked MDU. The management module may wait to provide another command until it receives an indication from the MDU that it has successfully completed the previous command.

In at least one embodiment, the inventory management system may include a variety of user devices. The workspace management module may be configured to determine tasks and assign individual tasks to particular resource (e.g., individual personnel) via a user device. In some embodiments, this user device may include any suitable electronic device (e.g., smartphones, tablets, scanners, laptops, etc.) configured to receive these task assignments and provide information to the user regarding the task. The user device may further be configured to enable the user to view, via a graphical user interface, various components of the workspace while in operation. The user device may further be configured to enable a user to provide planned path data indicating an intended traversal path of the user within the workspace. The user device may be portable and/or a handheld device. For clarity, a device configured to perform the functionality described above is referred to herein as a "handheld user device" although it should be appreciated that this user device need not necessarily be handheld.

Another user device utilized within the workspace may be a wearable device (e.g., a vest, a shirt, a pair of pants, a headset, smart glasses, or the like, any of which having a number of electronic components). This type of user device may include one or more transmitter devices, one or more feedback devices, one or more user input devices, one or more batteries, or the like and is referred to herein as a "wearable user device." It should be appreciated that this type of user device may be a standalone unit and need not necessarily be wearable.

A wearable user device may be configured to operate in a variety of states (e.g., power on, activate, deactivate, etc.). A wearable user device may include one or more feedback devices each configured to provide any suitable combination of feedback (e.g., haptic feedback, visual feedback, audible feedback) indicating the operational state of the wearable user device. A wearable user device may include one or more user input devices for obtaining user input. By way of example, a user input device may include a toggle, a button, a key pad, a selectable knob, a touchscreen, or any suitable mechanism for obtaining user input. A wearable user device may include one or more (e.g., two) transmitter devices. Each transmitter device may be configured to communicate via one or more communication channels (e.g., WiFi, short-range radio, etc.). By way of example a transmitter device may include a first antenna for conducting communications via WiFi and a second antenna for conducting communications utilizing short-range radio signals. Although referred to as "transmitter devices," it should be appreciated that each of these devices may be configured to receive data from its corresponding communications channel(s). In some embodiments, each transmitter device may be configured to transmit one or more radio signals having a particular frequency (e.g., 125 kHz, 925 MHz, 433 MHz, etc.) and a particular range (e.g., 5-7 meters, 25-30 meters, etc.).

In embodiments in which the wearable user device is configured with two or more transmitter devices, each transmitter devices may alternate between transmitting the one or more radio signals and monitoring the transmission of the one or more radio signals by another transmitter device. By way of example, a first transmitter device may transmit one or more radio signals at particular frequencies (e.g., 125 kHz, 925 MHz, 433 MHz, or any suitable combination of the above). While the first transmitter device is transmitting, a second transmitter device may be configured to monitor the transmissions of the first transmitter device. Should the second transmitter device fail to detect one or more of the expected transmissions of the first transmitter device, the second transmitter device may be configured to inform the management system that the first transmitter device is faulty (e.g., failing to transmit at least one expected radio signal). The first transmitter device and the second transmitter device can be configured to alternate between transmitting the radio signal(s) and monitoring the transmission(s) of the other transmitter device in accordance with a predetermined scheme. For example, the transmitter devices may be configured to alternate between transmission and monitoring functions upon a predetermined schedule and/or according to a predetermined scheme (e.g., alternate every 250 ms). The predetermined schedule and/or scheme may cause the transmitter devices to alternate between transmission and monitoring functions at a set rate or the schedule and/or scheme may cause the periods of time for performing transmitting and monitoring to vary. It should also be appreciated that each of the transmitter devices may be configured to monitor its corresponding components for errors/faults and transmit an indication of such errors/faults to the management system.

It should be appreciated that, in some embodiments, a single component of the wearable user device may perform multiple functions. By way of example, a single component of the wearable user device may include one or more feedback devices and one or more user input devices such that this component may be configured to not only receive user input, but also to provide suitable feedback (e.g., an indication of the operational state of the wearable user device).

The inventory management system may include any suitable number of MDUs automatically or semi-automatically moving inventory or performing other tasks within the inventory management system according to generated paths. An MDU may be configured to receive task assignment and various commands from the workspace management module and perform operations in accordance with the task assignment and received commands. During operation, the MDU may be configured to provide navigational information, state information, or any suitable data to the workspace management module. An MDU may be configured with one or more receiver devices configured to receive radio signals transmitted by a wearable user device. In some embodiments, the MDU may be configured to slow its traveling speed when a particular frequency signal (e.g., a 925 MHz signal) is received. Similarly, the MDU may be configured to stop motion when a different frequency signal (e.g., a 125 kHz signal) is received. The MDU may provide (e.g., to the workspace management module) an indication that a particular frequency signal (or alternatively, any suitable radio signal provided by a wearable user device) has been received by the MDU. This information may be provided at any suitable time and in any suitable manner. In some embodiments, the indication of the received radio signal may be provided along with or separate from navigational information indicating, among other things, a location, a speed of the MDU, or the like. The MDU may be configured with one or more feedback devices (e.g., one or more LED lights) that indicate when the MDU is receiving a radio signal (e.g., a particular radio signal). By way of example, a feedback device may present a yellow light while the MDU receives a 925 MHz signal (and/or 433 MHz) and a red light while the MDU receives a 125 kHz signal. In some embodiments, the MDU may present a blue colored light (or a different colored light) when receiving the 925 MHz (or 433 MHz) signal and/or the 125 kHz signal. The particular color utilized for the light provided may vary as desired. In some embodiments, the light may be solid or blinking.

In operation, a task may be provided to an MDU by the workspace management module. Another task may be assigned to a user and presented via a handheld user device of the user. The user may don a wearable user device and perform a variety of operations to power on and eventually activate the components of the wearable user device. The operational state(s) (e.g., power on, activated, deactivated) of the wearable user device may be clearly indicated at the wearable user device via a variety of feedback devices. While operating in an activated state, the wearable user device may transmit one or more radio signals that, when received by an MDU, may cause the MDU to slow or stop, depending on the particular frequency of the radio signal received. The MDU may further indicate (e.g., via an LED light or other suitable visual indicator) that the MDU is receiving the particular signal. Accordingly to the techniques and device interactions described above, the user of the wearable user device may travel within the workspace while the operations performed by the wearable user device, the MDUs, and the workspace management module ensure that motion of the MDUs near the wearable user device are altered based at least in part on the presence of the wearable user device. The operational state of the wearable user device may be clearly presented utilizing a variety of types of feedback such that the wearer and nearby personnel are able to easily identify the operational state of the wearable user device. Similarly, feedback devices at the MDU may be trigger to indicate when a signal is being received from a wearable user device.

In some embodiments, receipt by the workspace management module of an indication of the active state of the wearable user device which may trigger a fault detection process performed by the workspace management module. The fault detection process may include monitoring, by the management system, the connections and/or state of the transmitter devices of the wearable user device. The workspace management system may further be configured to receive fault indications from any suitable transmitter device. These fault indications may indicate a fault associated with the transmitter device providing the indication and/or a fault associated with a different transmitter device than the one providing the indication. Should the workspace management module detect (e.g., via its own monitoring, via receiving a fault indication from one or more transmitter devices, etc.) a fault associated with one or more transmitter devices, the workspace management module may be configured to transmit a stop command to any suitable number of the MDUs in the inventory management system to cause the receiving MDUs to halt motion. In some embodiments, the stop command may not be transmitted until a predetermined time period (e.g., 120 seconds, 160 seconds, five minutes, etc.) has elapsed by which the fault has not been resolved.

Utilizing the techniques, devices, and device interactions discussed above, the situational awareness of the user with respect to the operation of the wearable user device and/or the MDU is improved. By utilizing the various devices herein in the manner described above, the efficiency of the system as a whole may be improved. For example, conventionally, operation of the entire workspace may have been halted while a user performed a simple maintenance task within the workspace. By utilizing the techniques discussed herein, the user may conduct his task unabated, while the effect of his presence may be localized to a threshold distance of his current location. This may result in increased throughput and improved efficient of the system as a whole.

FIG. 1 is a schematic diagram illustrating an example workspace 110 suitable for implementing aspects of an inventory management system 100, in accordance with at least one embodiment. As a non-limiting example, the inventory system may include a workspace management module 102, one or more mobile drive units (e.g., mobile drive unit 104-1, mobile drive unit 104-2, mobile drive unit 104-3, and mobile drive unit 104-4, hereinafter collectively referred to as "mobile drive units 104"), one or more storage containers 106, and one or more workstations 108 within the workspace 110. In some embodiments, workstations 108 may include an area for which specific tasks are performed (e.g., packing items within a shipping container, taking inventory of the items within workspace 110, managing other operators of the workspace 110, and the like).

In some embodiments, the mobile drive units 104 may transport storage containers 106 between points within a workspace 110 (e.g., a warehouse, a storage facility, or the like) in response to commands communicated by workspace management module 102. While the workspace management module 102 is depicted in FIG. 1 as being separate from the mobile drive units 104, it should be appreciated that the workspace management module 102, or at least some aspects of the workspace management module 102, may be additionally or alternatively be performed by a processor of the mobile drive units 104. Within the workspace 110, each of the storage containers 106 may store one or more types of inventory items. As a result, the inventory system may be capable of moving inventory items between locations within the workspace 110 to facilitate the entry, processing, and/or removal of inventory items from inventory system and the completion of other tasks involving inventory items.

The workspace management module 102 may assign tasks to appropriate components (e.g., mobile drive units 104, various operators, etc.) of the inventory management system and coordinate operation of the various components in completing the tasks. The workspace management module 102 may select components of inventory system (e.g., one or more mobile drive units 104 and/or one or more operators, etc.) to perform these tasks and communicate appropriate commands and/or data to the selected components and/or devices associated with the selected components to facilitate completion of these operations. In some embodiments, an operator may utilize a handheld user device such as a scanner, a smart device, or the like to receive such commands or exchange any suitable information with the workspace management module 102. Although shown in FIG. 1 as a single, discrete component, the workspace management module 102 may represent multiple components and may represent or include portions of the mobile drive units 104 or other elements of the inventory management system.

The mobile drive units 104 may move storage containers 106 between locations within the workspace 110. The mobile drive units 104 may represent any devices or components appropriate to move (e.g., propel, pull, etc.) a storage container based on the characteristics and configuration of the storage containers 106 and/or other elements of inventory system. In a particular embodiment of inventory system, the mobile drive units 104 represent independent, self-powered devices configured to freely move about the workspace 110. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 104 represent elements of a tracked inventory system configured to move the storage containers 106 along tracks, rails, cables, crane system, or other guidance or support elements traversing the workspace 110. In such an embodiment, the mobile drive units 104 may receive power and/or support through a connection to the guidance elements, such as a powered rail. Additionally, in particular embodiments of the inventory system the mobile drive units 104 may be configured to utilize alternative conveyance equipment to move within the workspace 110 and/or between separate portions of the workspace 110.

Additionally, the mobile drive units 104 may be capable of communicating with the workspace management module 102 to receive information identifying selection of the storage containers 106, transmit the locations of the mobile drive units 104, or exchange any other suitable information to be used by the workspace management module 102 or the mobile drive units 104 during operation. The mobile drive units 104 may communicate with the workspace management module 102 wirelessly, using wired connections between the mobile drive units 104 and the workspace management module 102, and/or in any other appropriate manner. As one example, particular embodiments of the mobile drive unit 104 may communicate with the workspace management module 102 and/or with one another using 802.11, Bluetooth, or Infrared Data Association (IrDA) standards, or any other appropriate wireless communication protocol. As another example, in a tracked inventory system, tracks or other guidance elements upon which the mobile drive units 104 move may be wired to facilitate communication between the mobile drive units 104 and other components of the inventory system. In general, the mobile drive units 104 may be powered, propelled, and controlled in any manner appropriate based on the configuration and characteristics of the inventory system.

In at least one embodiment, the storage containers 106 store inventory items. The storage containers 106 are capable of being carried, rolled, and/or otherwise moved by the mobile drive units 104. In some embodiments, the storage containers 106 may include a plurality of faces, and each storage component (e.g., a bin, a tray, a shelf, an alcove, etc.) may be accessible through one or more faces of the storage container 106. The mobile drive units 104 may be configured to rotate the storage containers 106 at appropriate times to present a particular face to an operator or other components of the inventory system.

In at least one embodiment, inventory items represent any objects suitable for storage, retrieval, and/or processing in an automated inventory system. For the purposes of this description, "inventory items" (also referred to as "items" or "an item") may represent any one or more objects of a particular type that are stored in the inventory system. In at least one example, the inventory system may represent a mail order warehouse facility (e.g., operated by an electronic marketplace provider), and the items within the warehouse facility may represent merchandise stored in the warehouse facility. As a non-limiting example, the mobile drive units 104 may retrieve the storage containers 106 containing one or more inventory items requested in an order to be packed for delivery to a customer. Moreover, in some embodiments of the inventory system, boxes containing completed orders may themselves represent inventory items.

In particular embodiments, the inventory system may also include one or more workstations 108. The workstations 108 represent locations designated for the completion of particular tasks involving inventory items. Such tasks may include the removal of inventory items from the storage containers 106, the introduction of inventory items into the storage containers 106, the counting of inventory items in the storage containers 106, the decomposition of inventory items (e.g. from pallet- or case-sized groups to individual inventory items), the consolidation of inventory items between the storage containers 106, and/or the processing or handling of inventory items in any other suitable manner, to name a few. In particular embodiments, the workstations 108 may represent the physical locations where a particular task involving inventory items can be completed within the workspace 110. In alternative embodiments, the workstations 108 may represent both the physical location and also any appropriate equipment for processing or handling inventory items, such as robotic arms, scanners for monitoring the flow of inventory items in and out of the inventory system, communication interfaces for communicating with the workspace management module 102, and/or any other suitable components. The workstations 108 may be controlled, entirely or in part, by operators or may be fully automated. Moreover, operators may be capable of performing certain tasks involving inventory items, such as packing, counting, or transferring inventory items, as part of the operation of the inventory system.

In at least one embodiment, the workspace 110 represents an area associated with the inventory system in which the mobile drive units 104 can move and/or the storage containers 106 can be stored. For example, the workspace 110 may represent all or part of the floor of a mail-order warehouse in which the inventory system operates. Although FIG. 1 shows, for the purposes of illustration, an embodiment of the inventory system in which the workspace 110 includes a fixed, predetermined, and finite physical space, particular embodiments of the inventory system may include a workspace of variable dimensions and/or an arbitrary geometry. While FIG. 1 is intended to illustrate a workspace 110 that is entirely enclosed in a building, in some embodiments, some or all of the workspace 110 is located outdoors, within a vehicle (such as a cargo ship), or otherwise unconstrained by any fixed structure.

In operation, the workspace management module 102 may select appropriate components to complete particular tasks and may transmit task assignments 116 to the selected components to trigger completion of the relevant tasks. Each of the task assignments 116 defines one or more tasks to be completed by a particular component (e.g., one or more mobile drive units 104, one or more operators, etc.). These tasks may relate to the retrieval, storage, replenishment, and counting of inventory items and/or the management of the mobile drive units 104, the storage containers 106, the operators, the workstations 108 and/or other components of the inventory system. Depending on the component and the task to be completed, a task assignment may identify locations, components, and/or actions/commands associated with the corresponding task and/or any other appropriate information to be used by the relevant component in completing the assigned task.

In particular embodiments, the workspace management module 102 may generate task assignments 116 based, in part, on inventory requests that the workspace management module 102 receives from other components of the inventory system and/or from external components in communication with the workspace management module 102. These inventory requests identify particular operations to be completed involving inventory items stored or to be stored within the inventory system and may represent communication of any suitable form. For example, in particular embodiments, an inventory request may represent a shipping order specifying particular inventory items that have been purchased by a customer and that are to be retrieved from the inventory system for shipment to the customer. The workspace management module 102 may generate the task assignments 116 based at least in part on any suitable stimuli such as user input and/or a system determination indicating a maintenance task to be performed. After generating one or more of the task assignments 116, the workspace management module 102 may transmit the generated task assignments 116 to appropriate components (e.g., mobile drive units 104, computing devices associated with operators, etc.)

for completion of the corresponding task. The relevant components may then execute their assigned tasks.

With respect to the mobile drive units 104 specifically, the workspace management module 102 may, in particular embodiments, communicate task assignments 116 to selected mobile drive units 104 that identify one or more destinations for the selected mobile drive units 104. The workspace management module 102 may select a mobile drive unit (e.g., mobile drive unit 104-2) to assign the relevant task based on the location or state of the selected mobile drive unit, an indication that the selected mobile drive unit has completed a previously-assigned task, a predetermined schedule, and/or any other suitable consideration. These destinations may be associated with an inventory request the workspace management module 102 is executing or a management objective the workspace management module 102 is attempting to fulfill. For example, the task assignment may define the location of a storage container 106 to be retrieved, a workstation 108 to be visited, or a location associated with any other task appropriate based on the configuration, characteristics, and/or state of inventory system, as a whole, or individual components of the inventory system.

As part of completing these tasks the mobile drive units 104 may dock with and transport the storage containers 106 within the workspace 110. The mobile drive units 104 may dock with the storage containers 106 by connecting to, lifting, and/or otherwise interacting with the storage containers 106 in any other suitable manner so that, when docked, the mobile drive units 104 are coupled to and/or support the storage containers 106 and can move the storage containers 106 within the workspace 110. The mobile drive units 104 and storage containers 106 may be configured to dock in any manner suitable to allow a mobile drive unit to move a storage container within workspace 110. In some embodiments, the mobile drive units 104 represent all or portions of the storage containers 106. In such embodiments, the mobile drive units 104 may not dock with the storage containers 106 before transporting the storage containers 106 and/or the mobile drive units 104 may each remain continually docked with a storage container.

In some embodiments, the workspace management module 102 may be configured to communicate the task assignments 116 to user devices (e.g., handheld user devices such as scanners, tablets, smartphones, etc.) associated with an operator to instruct the operator to perform one or more tasks. The user device may further be configured to enable the user to view, via a graphical user interface, various components of the workspace while in operation. The user device may further be configured to enable a user to provide planned path data indicating an intended traversal path of the user within the workspace. The mobile drive units 104 and/or the user devices (e.g., handheld user devices) may individually be configured to provide task performance information to the workspace management module 102. Task performance information may include any suitable data related to the performance of an assigned task. By way of example, a mobile drive unit may send task performance information to the workspace management module 102 indicating that the task of moving a particular storage container to a particular station has been completed. A user device associated with a particular operator may transmit task performance information to the workspace management module 102 indicating that an item has been placed in or removed from the selected storage container, a maintenance task has been completed, or the like. Generally, any suitable information associated with task performance (e.g., a task identifier, a time of completion, an error code or other indication that the task was unsuccessful, a reason code or other indication as to why task performance was unsuccessful, etc.) may be provided as part of the task performance information.

Another user device utilized within the workspace may be a wearable device (e.g., wearable user device 118). The wearable user device 118 may include one or more transmitter devices, one or more feedback devices, one or more user input devices, and one or more batteries. It should be appreciated that wearable user device 118 may be a stand-alone unit and need not necessarily be wearable.

The wearable user device 118 may be configured to operate in a variety of states (e.g., power on, activate, deactivate, etc.). A wearable user device 118 may include one or more feedback devices each configured to provide any suitable combination of feedback (e.g., haptic feedback, visual feedback, audible feedback) indicating the operational state of the wearable user device 118. The wearable user device 118 may be configured to provide an indication of its operational state to the workspace management module 102 at any suitable time. The wearable user device 118 may include one or more user input devices for obtaining user input. The wearable user device 118 may include one or more (e.g., two) transmitter devices (e.g., one or more ultra-wide band (UWB) radio transmitters). Each transmitter device may be configured to communicate via one or more communication channels (e.g., WiFi, short-range radio, etc.). By way of example a transmitter device may include a first antenna for conducting communications via WiFi and a second antenna for conducting communications utilizing short-range radio signals. Although referred to as "transmitter devices," it should be appreciated that each of these devices may be configured to receive data from its corresponding communications channel(s). In some embodiments, each transmitter device may be configured to transmit one or more radio signals having a particular frequency (e.g., 125 kHz, 925 MHz, 433 MHz, etc., or any suitable combination of the above) and a particular range (e.g., 5-7 meters, 25-30 meters, etc.). By way of example, a first radio signal may have a range indicated at 120, while a second radio signal may have a range indicated at 122. In some embodiments, the transmitter devices may be configured to alternate responsibility for transmitting the one or more radio signals according to a predetermined scheme. For example, a first transmitter device may transmit the first and second radio signals for a predetermined time period. At the end of this predetermined time period, the first transmitter device may cease its transmission(s) and the second transmitter device may begin transmitting the one or more radio signals. The transmitter devices may alternate transmission responsibility at any suitable rate (e.g., a set rate, a modulating rate, etc.) and/or according to any suitable predetermined scheme and/or schedule.

The mobile drive units 104 may each be configured with one or more receiver devices configured to receive radio signals transmitted by the wearable user device 118. In some embodiments, the mobile drive units 104 may be configured to slow when a particular frequency signal (e.g., a 925 MHz signal) is received. Similarly, the mobile drive units may be configured to stop when a different frequency signal (e.g., a 125 kHz signal) is received. The mobile drive units 104 may provide (e.g., to the workspace management module 102) an indication that a particular frequency signal has been received by the mobile drive units 104. This information may be provided at any suitable time and in any suitable manner. In some embodiments, the indication that a particular radio signal has been received may be provided along with or separate from navigational information indicating, among other things, a location, a speed of the mobile drive unit, or the like. The mobile drive units 104 may be configured with one or more feedback devices (e.g., one or more LED lights, one or more speakers, etc.) that indicate when the mobile drive unit is receiving a radio signal (e.g., a particular radio signal). By way of example, a feedback device of the mobile drive unit 104-1 may present a yellow light while the MDU receives a 925 MHz (or 433 MHz) signal and a red light while the MDU receives a 125 kHz signal. In some embodiments, the mobile drive unit 104-1 may present a blue (or another) colored light when receiving the 925 MHz (or 433 MHz) signal and/or the 125 kHz signal. The color of the light provided may vary. In some embodiments, the light may be solid or blinking. A speaker of the mobile drive units 104 may similarly be utilized to present an audible indication indicating that a particular signal is being received.

While the appropriate components of inventory system complete assigned tasks, the workspace management module 102 may interact with the relevant components (e.g., the mobile drive units 104, the operators, the wearable user device 118, etc.) to ensure the efficient use of the resources available to inventory system. As one specific example of such interaction, workspace management module 102 is responsible, in particular embodiments, for planning the paths and managing the speed the mobile drive units 104 utilize when moving within the workspace 110 and for allocating use of a particular portion of the workspace 110 to a particular mobile drive units 104 for purposes of completing an assigned task. In such embodiments, the mobile drive units 104 may, in response to being assigned a task, request a path to a particular destination associated with the task.

Components of the inventory system (e.g., the mobile drive units 104, and/or the computing devices associated with the operators, and/or the wearable user device 118) may provide information to the workspace management module 102 regarding their current state, navigational data, other components of the inventory system with which they are interacting, and/or other conditions relevant to the operation of the inventory system. This may allow the workspace management module 102 to utilize feedback from the relevant components to update algorithm parameters, adjust policies, or otherwise modify its decision-making to respond to changes in operating conditions or the occurrence of particular events.

In addition, while the workspace management module 102 may be configured to manage various aspects of the operation of the components of the inventory system, in particular embodiments, the components themselves may also be responsible for decision-making relating to certain aspects of their operation, thereby reducing the processing load on the workspace management module 102.

Thus, based on its knowledge of the location, current state, and/or other characteristics of the various components of the inventory system and an awareness of all the tasks currently being completed, the workspace management module 102 can generate tasks, allot usage of system resources, and otherwise direct the completion of tasks by the individual components in a manner that optimizes operation from a system-wide perspective.

As a non-limiting example, an operator (not depicted) may don the wearable user device 118 and perform a series of operations to activate the wearable user device 118. While operating in an activated state, the wearable user device 118 may transmit, utilizing a first transmitter device, a first signal (e.g., a first radio signal) corresponding to a first range as indicated at 120. Also while operating in the activated state, the wearable user device 118 may transmit, utilizing a second transmitter device, a second signal (e.g., a second radio signal) corresponding to a second range as indicated at 122. The mobile drive unit 104-2 may be travelling along a planned path 124 corresponding to a task that was previously assigned by the workspace management module 102.

At location 126, the mobile drive unit 104-2 may begin receiving the first signal from the wearable user device 118. Based at least in part on receiving the first signal, the mobile drive unit 104-2 may be configured to slow its speed (e.g., to a speed corresponding to predetermined reduced speed or to a speed at or less than a predetermined threshold). In some cases, the mobile drive unit 104-2 may provide a visual and/or audible indication that it is in receipt of the first signal. Further, the mobile drive unit 104-2 may provide navigational information and/or state information to the workspace management module 102 indicating, at least, its current location, speed, and/or state indicating that it is currently receiving the first signal.

The mobile drive unit 104-2 may continue traversing its planned path 124 until it reaches location 128. At location 128, the mobile drive unit 104-2 may begin receiving a second signal from the wearable user device 118. Based at least in part on receiving the second signal, the mobile drive unit 104-2 may be configured to stop motion. In some cases, the mobile drive unit 104-2 may provide a visual and/or audible indication that it is in receipt of the second signal. Further, the mobile drive unit 104-2 may provide navigational information and/or state information to the workspace management module 102 indicating, at least, its current location, speed, and/or state indicating that it is currently receiving the second signal.

Subsequently, the operator of the wearable user device 118 may move to a location 130. As the wearable user device 118 is moved away from the mobile drive unit 104-2 located at location 128, the mobile drive unit 104-2 may no longer receive the second signal. In some embodiments, the mobile drive unit 104-2 may continue traversing along the planned path 124. Should the mobile drive unit 104-2 still be receiving the first signal from the wearable user device 118, the traversal may be at a reduced speed (e.g., a speed corresponding to predetermined reduced speed and/or a speed at or less than a predetermined threshold). When the mobile drive unit 104-2 is no longer in receipt of the first signal, the mobile drive unit 104-2 may be configured to increase its speed (or resume traveling at its intended speed) to perform its assigned task. The mobile drive unit 104-2 may provide navigational information and/or an indication of an operational state of the mobile drive unit and/or an indication of one or more signals currently being received at any suitable time (e.g., at a set periodicity, at change to an operational parameter such as speed, etc.).

In some embodiments, receipt by the workspace management module 102 of an indication of a particular operational state (e.g., an activated state) of the wearable user device 118 may trigger a fault detection process performed by the workspace management module 102 to monitor the connections and/or state of the transmitter devices of the wearable user device 118. The workspace management module 102 may be configured to receive fault indications from any suitable transmitter device. Should the workspace management module 102 detect a fault associated with one or more transmitter devices (e.g., by detecting one or more transmitter devices are no longer connected to a wireless network associated with the workspace 110, by receiving a fault indication from a transmitter device, etc.), the workspace management module 102 may be configured to transmit a stop command to any suitable number of the mobile drive units 104 to cause the receiving mobile drive units to halt motion. The stop command may be addressed to particular mobile drive units and/or the stop command may be broadcasted to all of the mobile drive units 104. In some embodiments, the stop command may not be transmitted until a predetermined time period (e.g., 120 seconds, 160 seconds, five minutes, etc.) has elapsed by which the fault has not been resolved.

Figure 2:
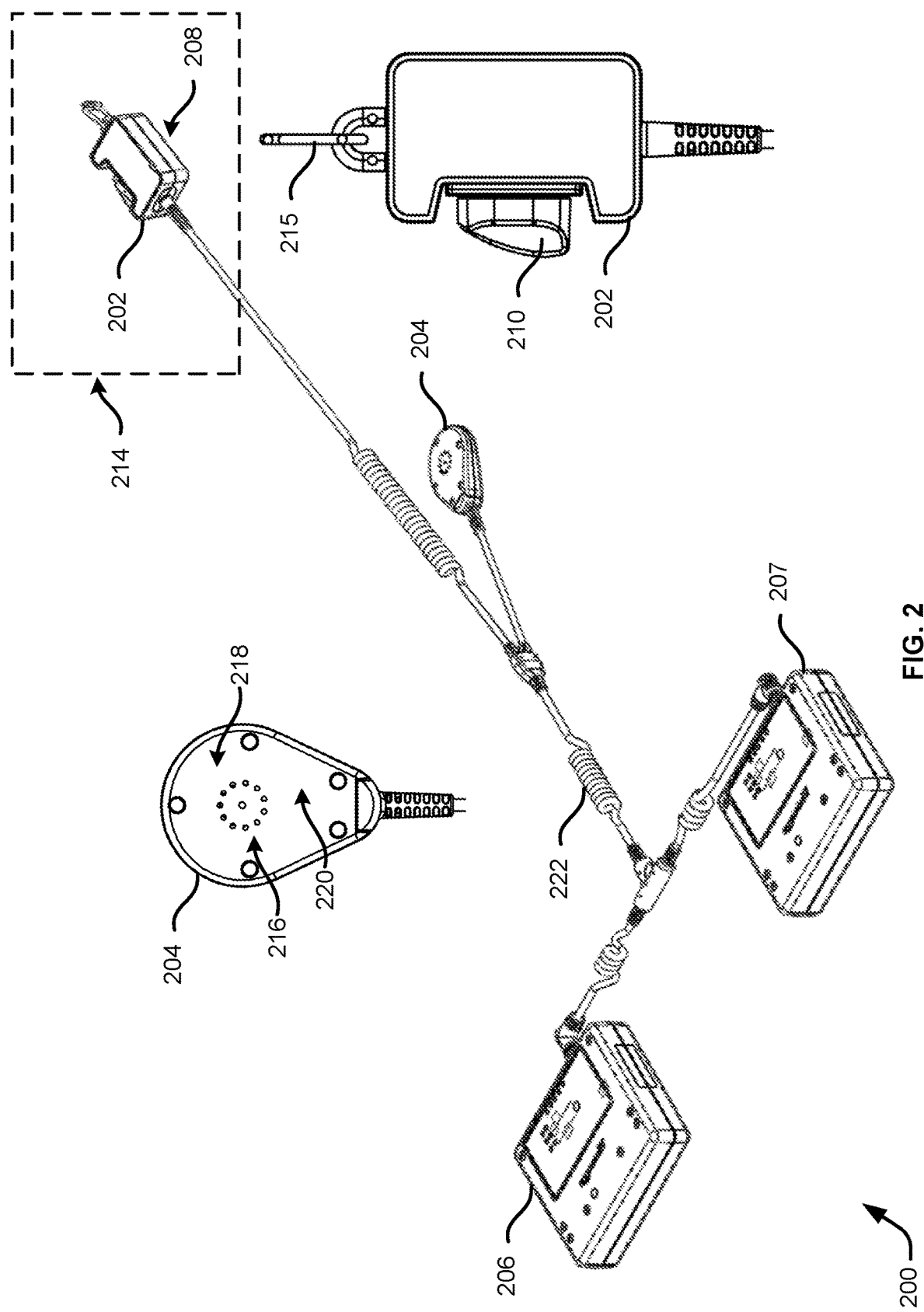
FIG. 2 illustrates example components of a user device, in accordance with at least one embodiment.

FIG. 2 illustrates example components of a user device 200, in accordance with at least one embodiment. The user device 200 may be an example of the wearable user device 118 of FIG. 1. The user device 200 may include one or more user input device(s) (e.g., the user input device 202), one or more feedback device(s) (e.g., feedback device 204), one or more transmitters (e.g., the transmitter device 206, the transmitter device 207, etc.). It should be appreciated that, in some embodiments, one or more user input device(s) and one or more feedback device(s) may be combined into a single component of the user device 200, such that that component may collect user input and/or provide feedback at the same component.

In the embodiment depicted in FIG. 2, the user device 200 includes user input device 202. A user input device (e.g., the user input device 202) may include any suitable user interface elements. By way of example, the user input device 202 may include a knob, a button, a key pad, a rotatable switch, a touch screen, or the like with which user input may be provided. As depicted, the user input device 202 may include rotational switch 210. In some embodiments, the rotational switch 210 may be manipulated in a manner corresponding to an action and/or an operational state. By way of example, the rotational switch 210 may rotated in a counter-clockwise fashion for a period of time (e.g., 1 second, 2 seconds, etc.) to indicate a power on action corresponding to powering on the user device 200. As another example, once powered on, the rotational switch 210 may be rotated clockwise for a predetermined amount of time (e.g., 2 second, three seconds, etc.) to indicate an activate action corresponding to activating the user device 200. As yet another example, once activated, the user device 200 has been activated, the rotational switch 210 may be rotated clockwise for a predetermined amount of time (e.g., three seconds, four seconds, a time period different than the time period associated with the activate action, etc.) to indicate a deactivate action corresponding to deactivating the user device 200. It should be appreciated that the particular manner in which the user input device is manipulated and/or the particular user input (e.g., key strokes, button selections, etc.) utilized to indicate a corresponding action may vary.

In the example depicted in FIG. 2, user input device 202 may also include a feedback device 212. The combination of the user input device 202 and the feedback device 212 may collectively be referred to as the component 214. In some embodiments, the feedback device 212 may include any suitable feedback device configured to provide visual, audible, and/or haptic feedback. For example, the feedback device 212 may include one or more LED lights for providing visual feedback the component. In some embodiments, the LED lights may provide any suitable color and/or pattern associated with a particular operational state of the user device 200.

In some embodiments, the user input device 202 may include attachment mechanism 215. By way of example, the attachment mechanism 215 may include a carabiner, a hook, a belt, a button, or any suitable means for attaching the user input device 202 (component 214) to a wearable article (e.g., a vest, a shirt, a coat, a hat, pants, etc.). An example of such an article will be described further in connection with FIG. 3.

In some embodiments, the user device 200 may include feedback device 204. In some embodiments, the feedback device 204 may include a speaker 216, a haptic feedback device 218, and/or a visual feedback device 220. For example, the feedback device 204 may include a visible LED light, an audible intelligible speaker to generate sound, and a vibrating eccentric motor for providing haptic feedback. The feedback device 204 may be contained in a zippered semi-transparent pouch that is configured to mount to a wearable article (e.g., the wearable article 300 of FIG. 3). In some embodiments, the visual feedback device 220 includes at least one LED coupled to a silicone light diffuser to cause the feedback device 204 to glow and be equally visible from all viewing angles. Similar to the feedback device 212, the visual feedback device 220 may be utilized to provide visual feedback corresponding to an operational state of the user device 200. The visual feedback may be any suitable color and/or pattern associated with a particular operational state of the user device 200. In some embodiments, the visual feedback provided by the visual feedback device 220 may correspond to the visual feedback provided at the feedback device 208. The speaker 216 may provide audible feedback corresponding to an operational state of the user device 200. Particular audible feedback associated with operational states of the user device 200 may vary in pitch, duration, and/or patterns such that one audible feedback is distinguishable from other audible feedback and identifiable as being related to a particular operational state. The haptic feedback device 218 may provide, via a haptic transducer, haptic feedback corresponding to an operational state of the user device 200. Particular haptic feedback associated with operational states of the user device 200 may vary in frequency, strength, duration, and/or pattern such that one haptic feedback is distinguishable from other haptic feedback and may be identifiable as being related to a particular operational state.

In some embodiments, the user device 200 may include one or more transmitter devices (e.g., transmitter devices 206 and 208). Transmitter devices 206 and 208 may each include one or more ultra-wide band radio transmitters. In some embodiments, the transmitter device 206 and the transmitter device 207 may each be preconfigured to transmit one or more radio signals at one or more frequencies (e.g., 125 kHz, 925 MHz, 433 MHz, etc., or any suitable combination of the above). In some embodiments, one signal transmitted by transmitter device 206 and/or the transmitter device 207 may have a lesser range than another signal transmitted by the same device. Each of the transmitter devices may include a wireless antenna (not depicted) for communication with the workspace management module 102 of FIG. 1 via a wireless communications protocol (e.g., WiFi). In some embodiments, the transmitter device 206 and/or the transmitter device 207 may include a battery (not depicted) that may be utilized to provide power to the various components of the user device 200 (e.g., the component 214, the feedback device 204, the transmitter devices 206 and/or 208) directly, or via power cable 222.

The transmitter device 206 and the transmitter device 207 may each be configured to monitor its internal components for errors/faults as well as monitoring the other transmitter for errors/faults. In some embodiments, the transmitter device 206 and the transmitter device 207 may be configured to alternate between transmitting the one or more radio signals and monitoring the transmission of the one or more radio signals by the other transmitter device. By way of example, a first transmitter device may transmit one or more radio signals at particular frequencies (e.g., 125 kHz, 925 MHz, 433 MHz, or any suitable combination of the above). While the first transmitter device is transmitting, a second transmitter device may be configured to monitor the transmissions of the first transmitter device. Should the second transmitter device fail to detect one or more of the expected transmissions of the first transmitter device, the second transmitter device may be configured to an indication of the fault to a remote computer (e.g., the workspace management system 102 of FIG. 1). The first transmitter device and the second transmitter device can be configured to alternate between transmitting the radio signal(s) and monitoring the transmission(s) of the other transmitter device in accordance with a predetermined scheme. For example, the transmitter devices may be configured to alternate between transmission and monitoring functions upon a predetermined schedule and/or according to a predetermined periodicity (e.g., every 250 ms). It should also be appreciated that each of the transmitter devices may be configured to monitor its corresponding components for errors/faults and transmit an indication of such errors/faults to the management system.

Figure 3B:
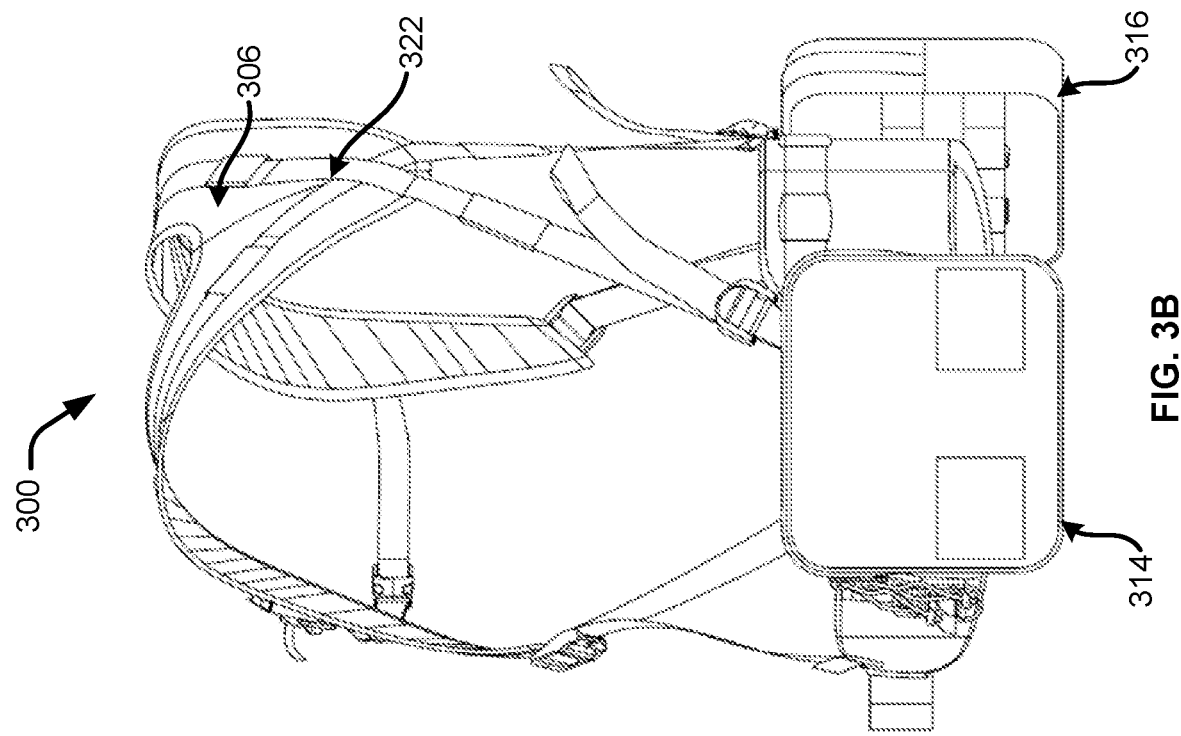
FIGS. 3A and 3B illustrates schematic diagrams depicting alternate views of a wearable article configured to receive the user device of FIG. 2, in accordance with at least one embodiment.
Figure 3A:
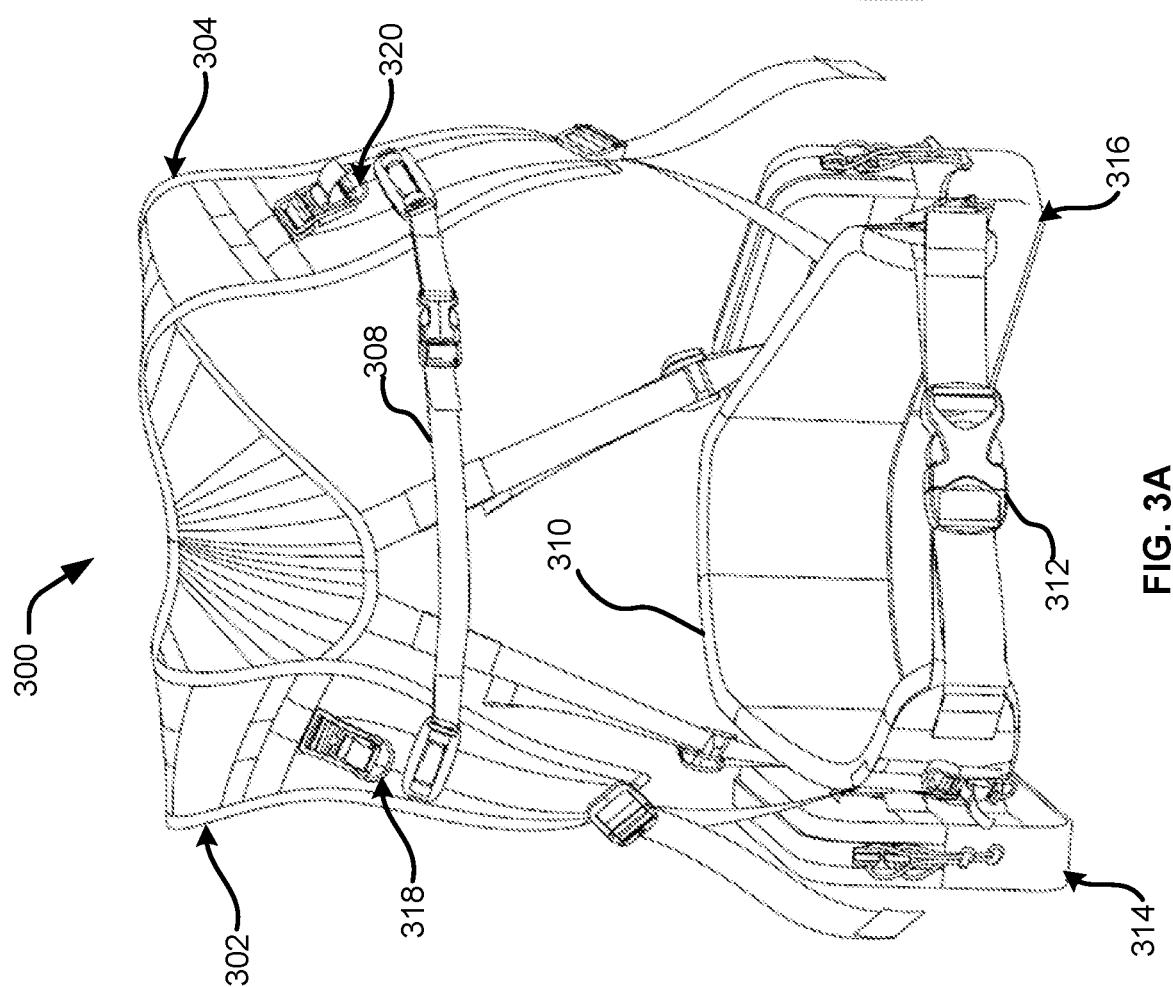

FIGS. 3A and 3B illustrates schematic diagrams depicting alternate views of a wearable article 300 configured to receive the user device 200 of FIG. 2, in accordance with at least one embodiment. FIG. 3A depicts a front view of the wearable article 300, while FIG. 3B depicts a side view of the wearable article 300. As depicted, the wearable article 300 is a vest. However, it should be appreciated that the wearable article may be in any suitable form (e.g., a shirt, a coat/jacket, or the like).

As depicted in FIG. 3A, the wearable article 300 may include two shoulder straps 302 and 304. Shoulder straps 302 and 304 may be connected to one another as depicted at 306 of FIG. 3B. A chest strap 308 may connect shoulder straps 302 and 304 from a front side of the wearable article 300 as depicted in FIG. 3A. The chest strap 308 may include a bucket and may be adjustable to increase and/or decrease a distance between the shoulder straps 302 and 304 when worn by a user. The wearable article 300 may further include a belt 310. The belt 310 may attach to the shoulder straps 302 and 304 and the shoulder straps 302 and 304 may individually be adjustable to lengthen or shorten to fit a torso area of the user. The belt 310 may also include a buckle 312 and may be adjustable to tighten or loosen the belt 310 around a waist area of the user when worn.

In some embodiments, the belt 310 may be attached to a pouch 314 and a pouch 316. The pouch may be zippered as depicted, or may have alternative closing mechanisms (e.g., Velcro®, buttons, etc.). Each of the pouches 314 and 316 may be configured to receive a transmitter device (e.g., the transmitter device 206 or the transmitter device 207 of FIG. 2). The placement of the pouches 314 and 316 may distribute weight of the transmitter devices 206 and/or 208 such that the weight of the user device 200 of FIG. 2 is evenly distributed over the wearable article 300.

In some embodiments, the wearable article 300 may include an attachment mechanism such as loop 318 and loop 320. The loop 318 and the loop 320 may individually be configured to attach to the user input device 202 of FIG. 2 (also referred to as component 214 of FIG. 2) via the attachment mechanism 215 of FIG. 2. As depicted in FIG. 2, the user device 200 may include an attachment mechanism (e.g., a carabiner) that may attach to either the loop 318 or the loop 320 to position the user input device 202 (or component 214) at a chest area of the user when wearing the wearable article 300. A carabiner and loop are used for illustrative purposes only, it is contemplated that a different attachment component may be utilized to attach the user input device 202 (component 214) to the wearable article 300.

In some embodiments, the feedback device 204 of FIG. 2 may be attached to a back of the wearable article as depicted at 322 of FIG. 3B. The feedback device 204 may be attached utilizing any suitable attachment mechanism. By way of example, the feedback device 204 may be contained in a zippered semi-transparent pouch that mounts to the back of the wearable article at 322. Placement of the feedback device 204 may ensure that the wearer can hear audible feedback from a speaker of the feedback device. The speaker (e.g., the speaker 216 of FIG. 2) may be configured to provide sound at a level that is predetermined as optimal given at least the distance from the wearer's ear. Additionally, the placement of the feedback device 204 at 322 may ensure that haptic feedback is felt by the user at a location approximately between the user's shoulder blades. This may provide an optimal location for providing a haptic indication of an operational state of the user device 200 of FIG. 2 without startling and/or annoying the user.

In some embodiments, the power cable 222 may run from the pouches 314 and 316, up the back of the wearable article 300. One segment of the power cable 222 may connect the feedback device 204 to a battery source. Another segment of the power cable 222 may be placed over a shoulder corresponding to loop 318 or loop 320 and may connect the user input device 202 (component 214 to the battery source.

The particular placement of the various components of the user device 200 on the wearable article 300 may increase the wearer's and other observer's awareness of the operational state of the user device 200. By way of example, by placing the feedback device 204 on the back of the wearable article at 322, the feedback device 204 may be easily viewable by other observers and thus, the operational state of the user device 200 may be easily ascertainable by the an observer even some distance away from the user device 200. Similarly, the placement of component 214 at the loop 318 or loop 319 may similarly enable the wearer and/or an observer viewing the front of the wearable article 300 to easily ascertain the operational state of the user device 200. The combination of feedback provided via the component 214 and/or the feedback device 204 of FIG. 2 may increase the likelihood that the wearer is aware of the operational state of the user device 200. This may reduce frustration of the wearer/operator, as well as reduce operator error when operating the user device 200. Additionally, or alternatively, the combination of feedback provided at the user device 200 may decrease the likelihood that a wearer/operator enters the workspace 110 when the user device 200 is operating in a state other than an activated state.

Figure 4:
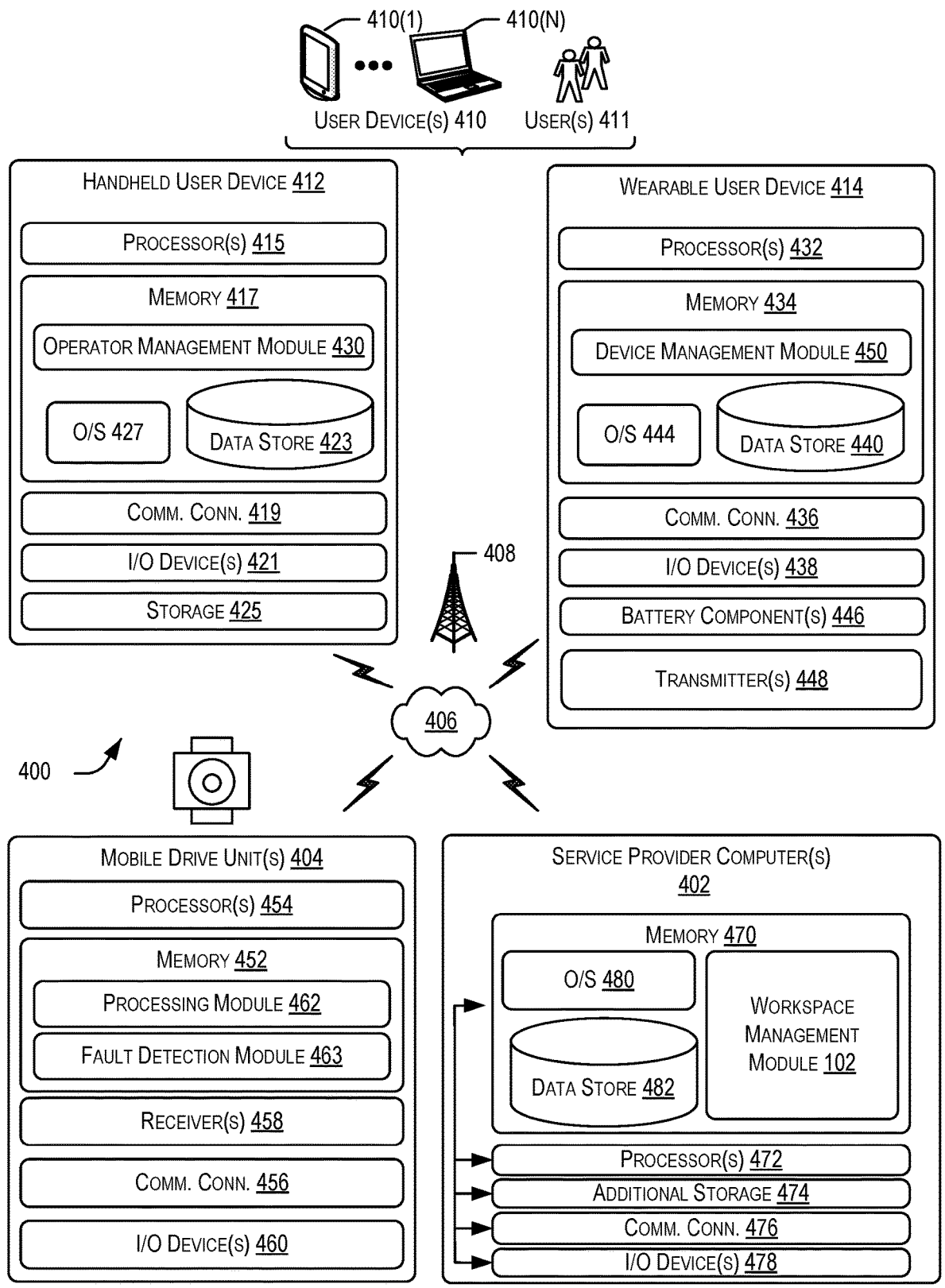
FIG. 4 is an example system architecture for an inventory system, in accordance with at least one embodiment.

FIG. 4 is an example system architecture 400 for implementing aspects of the inventory management system depicted in FIG. 1, in accordance with at least one embodiment. The architecture 400 may include a service provider computer(s) 402, mobile drive unit(s) 404 (MDU(s) 404), and user device(s) 410. The service provider computer(s) 402 may support an electronic marketplace (not shown) and interface with purchase and delivery services of the electronic marketplace. In this manner, the service provider computer(s) 402 may coordinate receiving, storing, packaging, and shipping of items in a warehouse operated by, or on behalf of, the electronic marketplace provider. In some examples, the service provider computer(s) 402 may be a stand-alone service operated on its own or in connection with an electronic marketplace.

In some embodiments, service provider computer(s) 402, MDU(s) 404, user devices 410(1)-410(N) (e.g., handheld user device 412 and/or wearable user device 414), may communicate via one or more network(s) 406 (hereinafter, "the network(s) 406"). The network 406 may include any one or a combination of many different types of networks, such as cable networks, the Internet, wireless networks, cellular networks, radio networks, and other private and/or public networks. At least one of the network(s) 406 may be accessible via access device 408. The access device 408 may include any suitable device that act as a transmitter and/or receiver of local area wireless network signals (e.g., "Wi-Fi", Long Term Evolution (LTE), Bluetooth, WirelessHD and WiGig, and Z-Wave).

User device(s) 410(1)-410(N) (hereinafter, "user device(s) 410) may be operable by one or more users 411 (hereinafter, "the users 411"). The user device(s) 410 may be any suitable device (e.g., portable or non-portable) capable of communicating with the network(s) 406 and operable by the users 411. The handheld user device 412 and the wearable user device 414 are examples of the user device(s) 410.

The handheld user device 412 may be handheld or otherwise, and may include any suitable computing device such as, but not limited to, a mobile phone, a smart phone, a personal digital assistant (PDA), a laptop computer, a thin-client device, a tablet PC, a desktop computer, a scanner, or other computing device. The handheld user device may include one or more processor(s) 415, memory 417, communication connection interfaces(s) 419, I/O devices 421, one or more data stores 423, additional storage 425, an operating system 427, and, in particular embodiments, an operator management module 430. The processor(s) 415 may be implemented as appropriate in hardware, computer-executable instructions, software, firmware, or combinations thereof. Computer-executable instruction, software or firmware implementations of the processor(s) 415 may include computer-executable or machine-executable instructions written in any suitable programming language to perform the various functions described. The memory 417 may include more than one memory and may be distributed throughout the handheld user device 412. The memory 417 may store program instructions (e.g. the operator management module 430) that are loadable and executable on the processor(s) 415, as well as data generated during the execution of these programs.

Depending on the configuration and type of memory, the memory 417 may be volatile (such as random access memory (RAM)) and/or non-volatile (such as read-only memory (ROM), flash memory, or other memory). The memory 417 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 417 may include multiple different types of memory, such as static random access memory (SRAM), dynamic random access memory (DRAM), or ROM. Turning to the contents of the memory 417 in more detail, the memory 417 may include an operating system 427 and one or more application programs, modules or services for implementing the features disclosed herein including at least the operator management module 430.

In some examples, the handheld user device may also include additional storage 425, which may include removable storage and/or non-removable storage. The additional storage 425 may include, but is not limited to, magnetic storage, optical disks, and/or tape storage. The disk drives and their associated computer-readable media may provide non-volatile storage of computer-readable instructions, data structures, program modules, and other data for the computing devices.

The memory 417, and/or the additional storage 425, may include volatile or non-volatile, removable or non-removable media implemented in any method or technology for storage of information such as computer-readable instructions, data structures, program modules, or other data. The memory 417 and the additional storage 425 are all examples of non-transitory computer storage media. Additional types of non-transitory computer storage media that may be present in the handheld user device 412 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the handheld user device 418. Combinations of any of the above should also be included within the scope of non-transitory computer-readable media.

The handheld user device 418 may also contain communication connection interface(s) 419 that allow the handheld user device 418 to communicate with a data store, another computing device or server, user terminals and/or other devices via the network(s) 406. The handheld user device 412 may also include I/O device(s) 421, such as a keyboard, a mouse, a pen, a voice input device, a touch input device, a display, speakers, a printer, etc.

The handheld user device may also include data store 423. The data store 423 may include one or more databases, data structures, or the like for storing and/or retaining information associated with the handheld user device 412 such as any suitable data related to task assignments, instructions, and/or task performance information.

In some embodiments, the operator management module 430 may be configured to provide one or more graphical user interfaces at the handheld user device 412 (e.g., via a display of the handheld user device 412). By way of example, the operator management module 430 may be configured to provide user interfaces for selecting a wearable user device (e.g., the wearable user device 414. Selection of the wearable user device 414 may associate the user of the handheld user device 412 with the wearable user device 414. The association may be maintained at the handheld user device 412 and/or transmitted to and maintained by the service provider computer(s) 402. The operator management module 430 may be configured to receive task assignments (e.g., the task assignments 116 of FIG. 1) from the service provider computer(s) 402 (e.g., the workspace management module 102). Any suitable information related to the task assignment may be presented via the I/O device(s) 421. In some embodiments, the operator management module 430 may provide one or more user interfaces for collecting any suitable user input such as a planned path of the user, task performance information, or the like. The operator management module 430 may be configured to transmit and receive any suitable information from any suitable component of the wearable user device 414, the MDU(s) 404, and/or the service provider computer(s) 402 via the network(s) 406. Any suitable data received, transmitted, and or collected by the handheld user device 412 may be presented at the handheld user device 412 via the I/O device(s) 421 (e.g., via a display and/or speaker of the handheld user device 412).

The wearable user device 414 (e.g., the wearable user device 118 of FIG. 1) may be wearable or otherwise. The components of the wearable user device 414 may be attached, affixed, and/or connected to a wearable article as described above in connection with FIG. 3. The wearable user device 414 may include one or more processor(s) 432, memory 434, communication connection interface(s) 436, I/O devices 438, one or more data stores 440, an operating system 444, one or more battery component(s) 446, one or more transmitter(s) 448 and, in particular embodiments, a device management module 450. The processor(s) 415 may be implemented as appropriate in hardware, computer-executable instructions, software, firmware, or combinations thereof. Computer-executable instruction, software or firmware implementations of the processor(s) 415 may include computer-executable or machine-executable instructions written in any suitable programming language to perform the various functions described. The memory 434 may include more than one memory and may be distributed throughout the wearable user device 414. The memory 434 may store program instructions (e.g. the device management module 450) that are loadable and executable on the processor(s) 432, as well as data generated during the execution of these programs.

Depending on the configuration and type of memory, the memory 434 may be volatile (such as random access memory (RAM)) and/or non-volatile (such as read-only memory (ROM), flash memory, or other memory). The memory 434 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 417 may include multiple different types of memory, such as static random access memory (SRAM), dynamic random access memory (DRAM), or ROM. Turning to the contents of the memory 434 in more detail, the memory 434 may include an operating system 444 and one or more application programs, modules or services for implementing the features disclosed herein including at least the device management module 450.

The memory 434 may be an example of a non-transitory computer-readable storage media. For example, the memory 434 may include volatile or non-volatile, removable or non-removable media implemented in any method or technology for storage of information such as computer-readable instructions, data structures, program modules, or other data. Additional types of non-transitory computer storage media that may be present in the wearable user device 414 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the wearable user device 414. Combinations of any of the above should also be included within the scope of non-transitory computer-readable media.

The wearable user device 414 may also contain communication connection interface(s) 436 that allow the wearable user device 414 to communicate with a data store, another computing device or server, user terminals and/or other devices via the network(s) 406 (e.g., via WiFi or any suitable wireless network protocol). The wearable user device 414 may also include I/O device(s) 438, such as the user input device(s) and/or the feedback device(s) discussed above in connection with FIG. 2.

The wearable user device 414 may also include data store 440. The data store 440 may include one or more databases, data structures, or the like for storing and/or retaining information associated with the wearable user device 414 such as any suitable data related to operational state information.

The wearable user device 414 may also include one or more battery component(s) 446. The battery component(s) 446 may be configured to provide battery power to any suitable combination of the components of the wearable user device 414.

The wearable user device 414 may also include one or more transmitter(s) 448 for communicating via one or more radio signals. In some embodiments, the one or more transmitter(s) 448 may each be an ultra-wide band (UWB) radio transmitter. In some embodiments, more than one (e.g., two) transmitters may be included in the wearable user device 414. Each transmitter may be preconfigured to transmit one or more radio signals via on or more particular frequencies each associated with a particular range. For example, each of the transmitter(s) 448 may be configured to transmit a first radio signal at a particular frequency (e.g., 925 MHz, 433 MHz, etc.) associated with a particular range and a second radio signal at a different frequency (e.g., 125 kHz) associated with a different range that is less than the range of the first radio signal. In some embodiments, the transmitter(s) may individually include the processor(s) 432, the components of the memory 434 (including the device management module 450), and/or the communication connection interface(s) 436. Accordingly, each transmitter may operate an instance of the device management module 450. In some embodiments, the transmitter(s) 448 may be configured to communicate with one another to exchange operational state information, to coordinate amongst one another with respect to radio signal transmission and/or fault monitoring efforts, and/or to exchange any suitable information associated with the transmitter(s) 448.

The device management module 450 may be configured to communicate with any suitable component of the inventory management system such as the user device(s) 410 (e.g., the handheld user device 412, another handheld user device operated by another user, etc.), the MDU(s) 404, and/or the service provider computer(s) 402 via the network(s) 406. The specific functionality of the device management module 450 may be discussed further with respect to FIG. 6.

The architecture 400 may also include MDU(s) 404 that may be configured to move within the inventory management system. In some embodiments, the MDU(s) 404 may each be an example of MDU(s) 104 of FIG. 1. The MDU(s) 404 may include at least one memory 452 and one or more processing units or processor(s) 454. The memory 452 may store program instructions that are loadable and executable on the processor(s) 454, as well as data generated during the execution of these programs. Depending on the configuration and type of the MDU(s) 404, the memory 452 may be volatile (such as random access memory (RAM)) and/or non-volatile (such as read-only memory (ROM), flash memory, etc.). The MDU(s) 404 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the MDU(s) 404. In some implementations, the memory 452 may include multiple different types of memory, such as static random access memory (SRAM), dynamic random access memory (DRAM), or ROM.

In some embodiments, the MDU(s) 404 may include communication connection(s) 456 for communicating with one or more other components and/or devices of the inventory management system such as the user devices 410 (including the handheld user device 412 and/or the wearable user device 414), and/or the service provider computer(s) 402 via any suitable wireless protocol (e.g., WiFi, Bluetooth®, Bluetooth Low Energy®, etc.). In some embodiments, the MDU(s) 404 may also include one or more receiver(s) 458 for receiving radio signals from the one or more transmitter(s) 448 of the wearable user device 414. The MDU(s) 404 may further include one or more input/output (I/O) device(s) 460. The I/O device(s) 460 may include any suitable combination of sensors such as time of flight sensors, imaging devices (e.g., one or more cameras), infrared sensors, thermal sensors, optical sensors, scanners, and the like. In some embodiments, the I/O device(s) 460 may include feedback devices such as one or more speakers, one or more lights (e.g., LED lights), or the like.

The processing module 462 may be configured to receive and/or transmit any suitable data related to task assignments (e.g., the task assignments 116), space reservation requests, navigational information of the MDU, operational state information of the MDU, movement commands, and/or any suitable data related to operating within the inventory management system. In operation, processing module 462 can receive and/or transmit any suitable data to the service provider computer(s) 402 at any suitable time. For example, the processing module 462 may receive a task assignment and/or instructions from the workspace management module 102 and may be configured to perform a variety of operations according to the task assignment and/or instructions received. During performance of a task, or at any suitable time, the processing module 462 may be configured to transmit navigational information (e.g., current location, current speed, etc.), sensor data received from the I/O device(s) 460, and/or operational state information (e.g., any suitable data indicating that the MDU is operating in a particular state such as "slow" or "stop," that the MDU is receiving one or more radio signals and/or the corresponding frequencies of the radio signal(s) being received, or the like). The processing module 462 may be configured to detect that the receiver(s) 458 are receiving one or more signals provided by the transmitter(s) 448 of the wearable user device 414. In response, the processing module 462 may be configured to transmit navigational information, operational state information, or any suitable data to the workspace management module 102. In some embodiments, upon detecting that a radio signal(s) corresponding to the transmitter(s) 448 is being received by the receiver(s) 458, the processing module 462 may be configured to indicate the same via one or more I/O device(s) 460. By way of example, receipt of a signal of a particular frequency may cause the processing module 462 to present (e.g., via an LED light and/or a speaker) an indication that a signal of that particular frequency is being received. The particular indications provided by the processing module 462 via the I/O device(s) 460 may vary based at least in part on the frequency of the signal currently being received by the receiver(s) 458.

In some embodiments, each of the MDU(s) 404 may include a fault detection module 463. The fault detection module 463 may be configured to monitor any suitable component of the MDU(s) 404 for error(s) and/or fault(s). By way of example, the fault detection module 463 may be configured to monitor the processor(s) 454, the memory 452, the receiver(s) 458, the communication connection(s) 456, and the I/O device(s) 460, or any suitable combination of the above. If an error and/or fault is detected by the fault detection module 463, the fault detection module 463 may transmit data indicating the fault to the workspace management module 102. As a specific, non-limiting example, the fault detection module 463 may monitor the receiver(s) 458 for faults. Upon detecting a fault in at least one of the receiver(s) 458, the fault detection module 463 may transmit any suitable data to the workspace management module 102 indicating the same. In some embodiments, the workspace management module 102 (e.g., the fault detection module 518 of FIG. 5) may be configured to instruct the MDU providing the information to stop (e.g., stop immediately, stop at the next location indicator or a particular location within the workspace, etc.). In some embodiments, the MDU may not return to being controlled by the workspace management module 102 until user input has been received (e.g., by the workspace management module 102) indicating that the MDU has been repaired.

It should be appreciated that the MDU(s) 404 may be configured with multiple instances of the fault detection module 463. In some embodiments, each instance of the fault detection module 463 may correspond to a particular component of the MDU. By way of example, one instance of the fault detection module 463 may correspond to a first receiver of the receiver(s) 468, while another instance of the fault detection module 463 may correspond to a second receiver of the receiver(s) 468. Alternatively, some or all of the components of the MDU(s) 404 may be monitored by a single instance of the fault detection module 463.

The service provider computer(s) 402, perhaps arranged in a cluster of servers or as a server farm, may host web service applications. These servers may be configured to host a website (or combination of websites) viewable via the user device(s) 410. In at least one example, the service provider computer(s) 402 may be configured to manage the MDU(s) 404 as part of an inventory management system. The service provider computer(s) 402 may include at least one memory 470 and one or more processing units (or processor(s)) 472. The processor(s) 472 may be implemented as appropriate in hardware, computer-executable instructions, software, firmware, or combinations thereof. Computer-executable instruction, software or firmware implementations of the processor(s) 472 may include computer-executable or machine-executable instructions written in any suitable programming language to perform the various functions described.

The memory 470 may include more than one memory and may be distributed throughout the service provider computer(s) 402. The memory 470 may store program instructions (e.g., workspace management module 102) that are loadable and executable on the processor(s) 472, as well as data generated during the execution of these programs. Depending on the configuration and type of memory including the workspace management module 102, the memory 470 may be volatile (such as random access memory (RAM)) and/or non-volatile (such as read-only memory (ROM), flash memory, or other memory). The service provider computer(s) 402 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 470 may include multiple different types of memory, such as static random access memory (SRAM), dynamic random access memory (DRAM), or ROM.

Turning to the contents of the memory 470 in more detail, the memory 470 may include an operating system 480 and one or more application programs, modules or services for implementing the features disclosed herein including at least the workspace management module 102. In some examples, the MDU(s) 404 may individually execute some portion of the workspace management module 102 to operate, at least partially, independent of the service provider computer(s) 402.

In some examples, the service provider computer(s) 402 may also include additional storage 474, which may include removable storage and/or non-removable storage. The additional storage 474 may include, but is not limited to, magnetic storage, optical disks, and/or tape storage. The disk drives and their associated computer-readable media may provide non-volatile storage of computer-readable instructions, data structures, program modules, and other data for the computing devices.

The memory 470 and the additional storage 474, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer(s) 402. The modules of the service provider computer(s) 402 may include one or more components. The service provider computer(s) 402 may also include input/output (I/O) device(s) 478 and/or ports, such as for enabling connection with a keyboard, a mouse, a pen, a voice input device, a touch input device, a display, speakers, a printer, or other I/O device.

In some examples, the I/O device(s) 478 may present one or more user interfaces for interacting with the service provider computer(s) 402. These user interfaces may include graphical user interfaces, web-based applications, programmatic interfaces such as application programming interfaces (APIs), or other user interface configurations. The service provider computer(s) 402 may also include data store 482. The data store 482 may include one or more databases, data structures, or the like for storing and/or retaining information associated with the service provider computer(s) 402 and/or information received from any suitable component of the inventory management system (e.g., the handheld user device 412, the wearable user device 414, the MDU(s) 404) including, but not limited to, navigational information, operational state information, user input provided at a user device (e.g., the handheld user device 412, the wearable user device 414), and the like.

Figure 5:
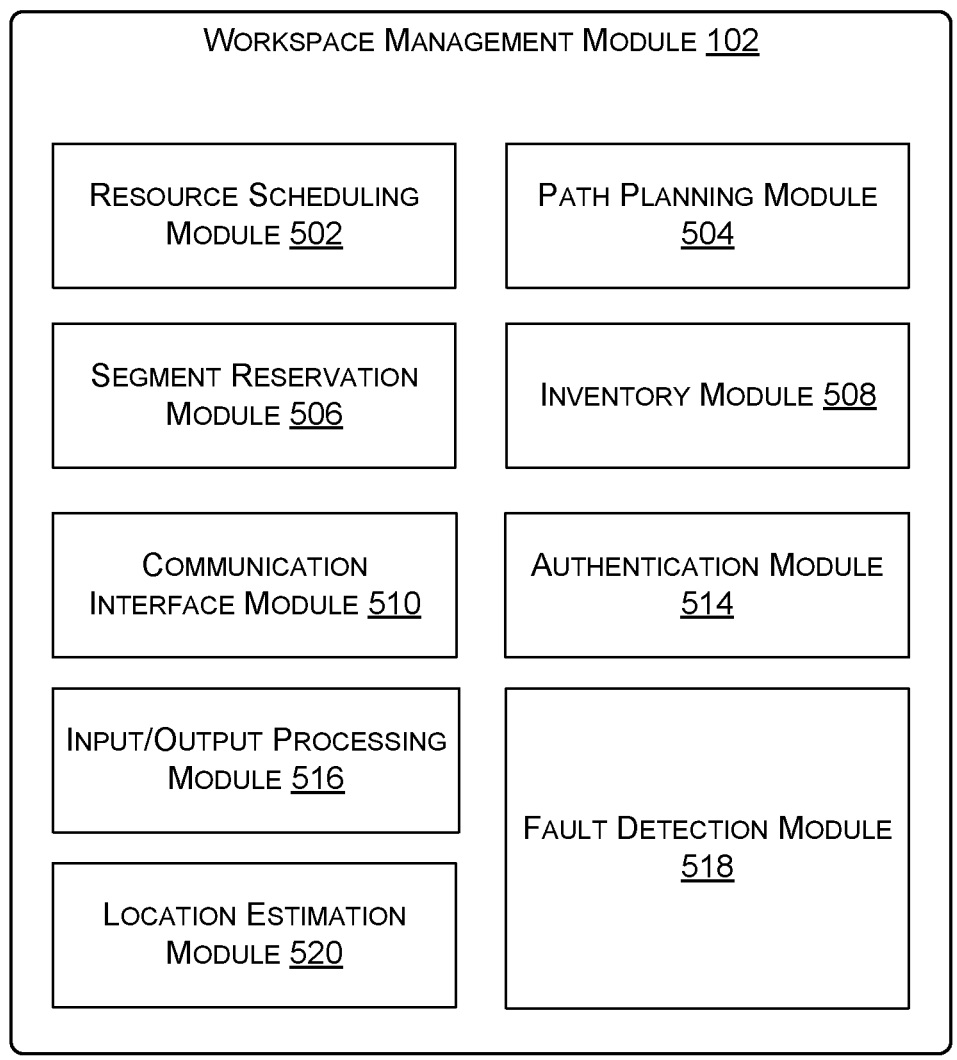
FIG. 5 illustrates in greater detail the components of a particular embodiment of a workspace management module, in accordance with at least one embodiment.

FIG. 5 illustrates in greater detail the components of a particular embodiment of a workspace management module 102 of FIGS. 1 and 4. As shown, the example embodiment includes a resource scheduling module 502, a path planning module 504, a segment reservation module 506, an inventory module 508, a communication interface module 510, an authentication module 514, an input/output processing module 516, a fault detection module 518, and a location estimation module 520. The workspace management module 102 may represent a single component, multiple components located at a central location within an inventory management system of FIGS. 1 and 4, or multiple components distributed throughout inventory management system.

In at least one embodiment, the resource scheduling module 502 may be configured to process received inventory requests and generate one or more assigned tasks to be completed by the components of the inventory management system described in the figures above. The resource scheduling module 502 may also select one or more appropriate components (e.g., one or more MDU(s) (e.g., MDU(s) 104 of FIG. 1, MDU(s) 404 of FIG. 4), one or more operators, etc.) for completing the assigned tasks (e.g., movement of a storage container, storage/retrieval of an item, performance of a maintenance task, etc.) and may communicate, via the communication interface module 510, the assigned tasks to the relevant components. In some examples, the resource scheduling module 502 may select the one or more appropriate components based on a location of the component, the capabilities of the component, a current task assignment of the component, and the like.

In at least one embodiment, the path planning module 504 may receive path request(s) from the MDUs. A path request may identify one or more destinations associated with a task (e.g., moving a storage container, storing/retrieving an item within/from a storage container, etc.) the requesting component is tasked with executing. In response to receiving a path request, the path planning module 504 may generate a path to one or more destinations identified in the path request. The path planning module 504 may implement any appropriate algorithms utilizing any appropriate parameters, factors, and/or considerations to determine the appropriate path. After generating an appropriate path, the path planning module 504 may transmit a path response identifying the generated path to the requesting robotic device using the communication interface module 510.

In at least one embodiment, the segment reservation module 506 may receive reservation requests from the MDUs attempting to move along paths generated by the path planning module 504. These reservation requests may indicate a request for the use of a particular portion of the workspace (referred to herein as a "segment") to allow the requesting MDUs efficiently utilize the workspace with respect to other MDUs of the system while moving across the reserved segment. In response to received reservation requests, segment reservation module 506 may transmit a reservation response granting or denying the reservation request to the requesting robotic device using the communication interface module 510.

In at least one embodiment, the inventory module 508 may maintain information about the location and number of inventory items in the inventory management system. Information can be maintained about the number of inventory items in a particular storage container, and the maintained information can include the location of those inventory items in the storage container.

In at least one embodiment, the communication interface module 510 may facilitate communication between workspace management module 102 and other components of inventory management system such as the handheld user device 412, the wearable user device 414, and/or the MDU(s) 404 of FIG. 4. These communications may relate to reservation responses, reservation requests, path requests, path responses, task assignments, navigational information, operational state information, and the like. Depending on the configuration of workspace management module 102, communication interface module 510 may be responsible for facilitating either or both of wired and wireless communication between the various components of inventory management system. In particular embodiments, workspace management module 102 may communicate via the communication interface module 510 using communication protocols such as 802.11, Bluetooth, or Infrared Data Association (IrDA) standards. In such embodiments, communication interface module 510 may facilitate communication between workspace management module 102 and other parts of the same system component.

In at least one embodiment, the authentication module 514 may be configured to receive a connection request from one or more components of a wearable user device (e.g., the wearable user device 414 of FIG. 4). The connection request may relate to a request for wireless credentials associated with a wireless network of the inventory management system (e.g., a local area network of the inventory management system). In some embodiments, the authentication module 514 may maintain a mapping for indicating particular transmitter(s) associated with particular wearable user devices. By way of example, the mapping may indicate that a wearable user device (e.g., associated with an alphanumeric wearable user device identifier) is associated with a first transmitter associated with a transmitter alphanumeric identifier (e.g., "apple") and a second transmitter associated with a transmitter alphanumeric identifier (e.g., "banana"). Upon receiving a connection request, the authentication module 514 verify that the requesting device (e.g., a transmitter) is authorized to connect to the network. In some embodiments, this verification may include determining, from the mapping, that a requesting device identifier of the connection request corresponds to a transmitter associated with a known wearable user device. If the transmitter is authorized to connect, the authentication module 514 may be configured to provide wireless network credentials to the requesting device to enable the requesting device to connect to a wireless network (e.g., a WiFi network) of the inventory management system. In some embodiments, the authentication module 514 may be configured to monitor network connectivity of the transmitters and provide an indication of the network connectivity of one or more transmitters of a wearable user device to the input/output processing module 516 and/or the fault detection module 518. For example, if a wearable user device is associated with two transmitters, the authentication module 514 may detect when both transmitters have WiFi connection and may provide any suitable data to the input/output processing module 516 and/or the fault detection module 518 indicating the same.

In some embodiments, the input/output processing module 516 may be configured to receive and/or transmit any suitable data to a user device (e.g., the handheld user device 412 of FIG. 4). In some embodiments, upon receiving an indication that all the transmitters of a given wearable user device are connected to a wireless network, the input/output processing module 516 may be configured to provide any suitable data to a handheld user device to indicate that the corresponding wearable user device is available for selection. Sending this data may cause the handheld user device to provide one or more user interfaces from which the wearable user device may be selected by a user. The input/output processing module 516 may receive an indication that a particular wearable user device was selected by a user and may maintain an association between the user and the wearable user device.

In some embodiments, the input/output processing module 516 may be configured to receive (e.g., from a handheld user device) planned path data corresponding to wearable user device. In some embodiments, the planned path data may be provided to the path planning module 504 such that paths of one or more MDUs of the system may be altered and/or generated based at least in part on the planned path of the wearable user device. In some embodiments, the input/output processing module 516 may provide the planned path data to the location estimation module 520 and/or store the planned path data in any suitable location accessible to the location estimation module and/or the path planning module 504.

The input/output processing module 516 may be configured to receive operational state information from one or more wearable user device (e.g., the wearable user device 414 of FIG. 4). In some embodiments, upon receipt operational state information indicating that a particular wearable user device 414 is operating in an activated state, the input/output processing module 516 may transmit any suitable data to the fault detection module 518 indicating the same.

In some embodiments, the fault detection module 518 may be configured to monitor for faults of one or more transmitters of one or more wearable user devices of the system. In some embodiments, the functionality of the fault detection module 518 may be triggered by receiving an indication (e.g., from the input/output processing module 516) that a particular wearable user device is operating in an activated state (indicating that all transmitters associated with the wearable user device are currently transmitting a signal). Upon receipt, the fault detection module 518 may monitor the network connections associated with each transmitted of the activated wearable user device. In some embodiments, the fault detection module 518 may detect when a transmitter has lost network connection. The fault detection module 518 may further be configured to receive fault indications from any suitable transmitter device (e.g., the transmitter(s) 448 of FIG. 4). These fault indications may indicate a fault associated with the transmitter device providing the indication and/or a fault associated with a different transmitter device than the one providing the indication In some embodiments, the fault detection module 518 may detect a fault associated with one or more transmitter devices based at least in part on monitoring the network connections of the transmitter devices and/or receiving one or more fault indications from one or more transmitter devices. In response to detecting a fault, the fault detection module 518 may immediately cause a stop command to be transmitted to one or more MDUs of the system. Alternatively, the fault detection module 518 may be configured to wait a predetermined time period (e.g., 160 seconds) after detecting the fault before transmitting a stop command. In some examples, the fault detection module 518 may cause a stop command to be transmitted based at least in part on determining that the predetermined time period has elapsed since the transmitter lost network connection, and that the transmitter has not regained network connection. The stop command may be addressed to one or more MDUs and/or the stop command may be broadcasted. Receipt of the stop command by any MDU may cause the MDU to halt motion.

In some embodiments, the fault detection module 518 may detect a fault associated with one or more MDUs (e.g., the MDU(s) 404) of FIG. 4. By way of example, the fault detection module 518 may receive (e.g., from the fault detection module 463 of FIG. 4) an indication that at least one component of an MDU is faulty. In accordance with receiving such data, the fault detection module 518 may be configured to instruct the MDU to stop. In some embodiments, the fault detection module 518 may transmit a stop command to the MDU immediately. In some embodiments, the stop command may cause the MDU to halt motion upon receipt. Alternatively, the stop command may cause the MDU to halt motion when it reaches a next location indicator or a particular location within the workspace.

In some embodiments, the location estimation module 520 may be configured to receive navigational information and/or operational state information from one or more MDUs of the inventory management system. The location estimation module 520 may be configured to estimate a location of a given wearable user device based at least in part on the planned path data associated with the wearable user device and/or the navigational information and/or operational state information received from the one or more MDUs. By way of example, the location estimation module 520 may detect one or more MDUs that are operating at a reduced speed or stopped altogether due to receiving one or more signals from a wearable user device. The location estimation module 520 may consult planned path data of each wearable user device of the system to determine that a particular wearable user device is most likely to be providing the signals affecting the MDUs. The locations, speeds, and/or operational states of the affected MDUs may be utilized to estimate a location of the wearable user device. The estimated location may be transmitted via the input/output processing module 516 to the handheld user device. Receipt of the estimated location may cause the handheld user device to present an indication of the location of the wearable device at a display of the device.

In general, the resource scheduling module 502, the path planning module 504, the segment reservation module 506, the inventory module 508, the communication interface module 510, the authentication module 514, the input/output processing module 516, the fault detection module 518, and the location estimation module 520, may each represent any appropriate hardware and/or software suitable to provide the described functionality. In addition, as noted above, workspace management module 102 may, in particular embodiments, represent multiple different discrete components and any or all of the resource scheduling module 502, the path planning module 504, the segment reservation module 506, the inventory module 508, the communication interface module 510, the authentication module 514, the input/output processing module 516, the fault detection module 518, and the location estimation module 520 may represent components physically separate from the remaining elements of workspace management module 102. Moreover, functionality provided by the resource scheduling module 502, the path planning module 504, the segment reservation module 506, the inventory module 508, the communication interface module 510, the authentication module 514, the input/output processing module 516, the fault detection module 518, and the location estimation module 520 may be provided by fewer modules than those depicted in FIG. 5.

It should be appreciated that although a single workspace management module 102 is depicted in various examples provided herein, more than one workspace management module 102 may be utilized. As a non-limiting example, multiple workspace management modules may be utilized where each workspace management module is configured to manage various components (e.g., MDUs, operators, etc.) in a given area of a workspace (e.g., a sub-area of the workspace 110, a floor of the workspace 110, etc.). Each workspace management module may be configured to communicate with other workspace management modules to exchange operational state information associated with a wearable user device, a location estimation of the wearable user device, fault detection information associated with a wearable user device, or the like. It is also contemplated that a single workspace management module may be utilized to manage multiple sub-areas and/or floors of the workspace 110. In some embodiments, the fault detection module 518 may be configured to detect a lost network connection associated with a particular transmitter device of a wearable user device. Another workspace management module (or the workspace management module 102) may subsequently receive a connection request and/or user input from the wearable user device indicating that the wearable user device has traveled to a different sub-area and/or floor of the workspace 110. Based at least in part on the connection request and/or user input and/or an predetermined time elapsing since the connection in the previous area was lost, the fault detection module 518 may transmit a stop command to one or more MDUs of the previous area. In some embodiments, such as when the user input and/or connection request indicates the wearable user device has traveled to a different area of the workspace 110, the fault detection module 518 may transmit any suitable data to a handheld device (e.g., the handheld device 412 of FIG. 4) associated with the user of the wearable user device to indicate that a fault is occurring in the previously occupied area. In some embodiments, the user may be instructed to return to the previously occupied area and/or the handheld user device may provide an override mechanism that, when selected, causes the fault detection module 518 to perform one or more operations to recover from the fault (e.g., transmit a resume command to all MDUs in the previously occupied area). In some embodiments, the override mechanism may be provided to the user of the wearable user device that triggered the fault and/or to a manager of the user of the wearable user device via one or more handheld devices.

Figure 6:
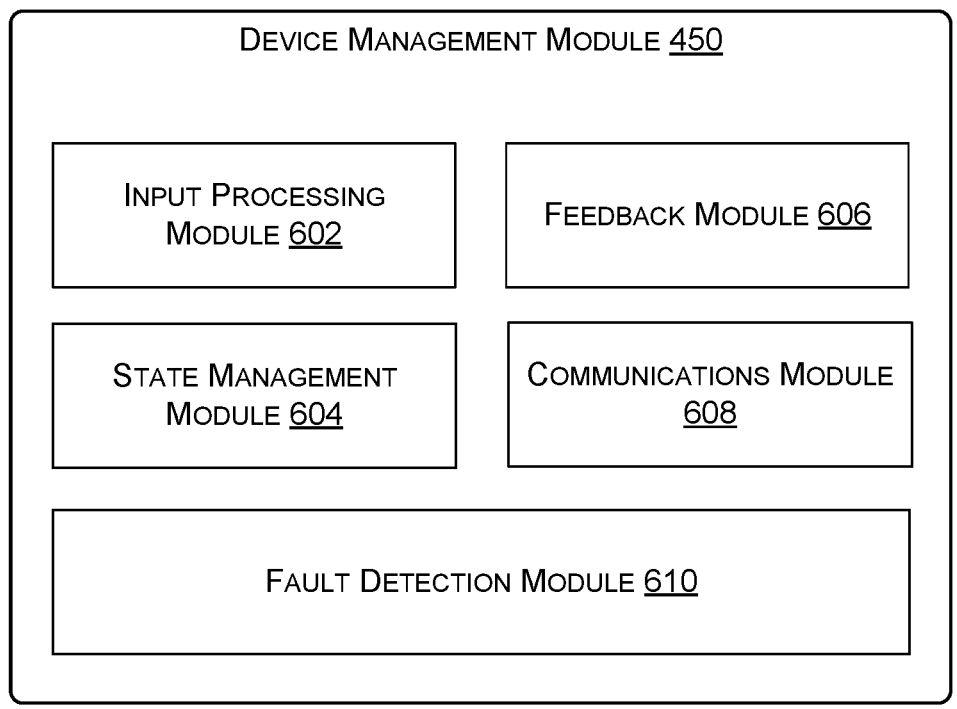
FIG. 6 illustrates in greater detail the components of a particular embodiment of a device management module, in accordance with at least one embodiment.

FIG. 6 illustrates in greater detail the components of a particular embodiment of a device management module 450 of FIG. 4. As shown, the example embodiment includes an input processing module 602, a feedback module 606, a state management module 604, a communications module 608, and a fault detection module 610.

In some embodiments, the input processing module 602 may be configured to receive user input from one or more user input devices (e.g., the user input device 202 of FIG. 2). In some embodiments, the input processing module 602 may provide the user input to the state management module 604 and/or the feedback module 606.

In some embodiments, the state management module 604 may be configured to manage the state of the user device on which the device management module 450 operates (e.g., wearable user device 414 of FIG. 4). In some embodiments, the state management module 604 may be configured to transition the wearable user device to operate in a particular state based at least in part on user input received via the input processing module 602. In some embodiments, the wearable user device has a number of possible operational states (e.g., power on, activate, deactivate, etc.) each operational state being associated with a particular set of operations.

In some embodiments, the state management module 604 may receive user input (e.g., via the input processing module 602) indicating an action to power on the wearable user device. In some embodiments, the user input may correspond to the user moving a knob to a position associated with powering on the wearable user device, although other user input mechanisms may be employed to indicate an action to power on the wearable user device. Upon receiving such user input, the state management module 604 may be configured to generate and store operational state information indicating the wearable user device is powering on. In some embodiments, the state management module 604 may be configured to provide the operational state information indicating a power on state to the feedback module 606 and/or a remote system (e.g., the workspace management module 102 of FIGS. 1, 4, and 5).

In some embodiments, the feedback module 606 may be configured to receive user input via the input processing module 602 and/or operational state information from the state management module 604. The feedback module 606 may determine a corresponding feedback to be provided via one or more feedback devices of the wearable user device based at least in part on the user input and/or the operational state information indicating a current operational state of the wearable user device. As a non-limiting example, the feedback module 606 may be configured to receive operational state information indicating that the wearable user device is in a power on state. In response, the feedback module 606 may be configured to provide any suitable feedback via one or more feedback devices of the wearable user device to indicate the power on state. For example, one or more audible beeps corresponding to a power on state may be presented via a speaker of the wearable user device. Additionally, or alternatively, one or more LED lights of one or more feedback devices may present a particular color and/or pattern associated with a power on state (e.g., a relatively slow blue blinking light). Additionally, or alternatively, one or more feedback devices may be utilized present haptic feedback (e.g., a vibration) that indicates the power on state of the wearable user device. The particular strength of the vibration and/or the number and/or pattern of vibrations may be unique to the power on state.

In some embodiments, the communications module 608 may be configured to attempt to connect to a network of the inventory management system. By way of example, the communications module 608 may receive (e.g., from the input processing module 602 and/or the state management module 604, or any suitable component of the device management module 450) the user input indicating a power on action and/or an operational state information associated with a power on state. In response to receiving such information, the communications module 608 may be configured to transmit a network connection request (e.g., to the workspace management module 102 of FIG. 5). The communications module 608 may further be configured to receive network credentials (e.g., from the workspace management module 102). Upon receipt of these credentials, the communications module 608 may be configured to connect (e.g., via WiFi, utilizing the communication connections 436 of FIG. 4) to a local network.

In some embodiments, the state management module 604 may receive user input (e.g., via the input processing module 602) indicating an action to activate the wearable user device. In some embodiments, the user input may correspond to the user moving a knob to a position associated with activating the wearable user device, although other user input mechanisms may be employed to indicate an action to activate the wearable user device. Upon receiving such user input, the state management module 604 may be configured to generate and store operational state information indicating the wearable user device is activated. In some embodiments, the state management module 604 may be configured to provide the operational state information indicating an activated state to the feedback module 606 and/or a remote system (e.g., the workspace management module 102 of FIGS. 1, 4, and 5). In some embodiments, the state management module 604 may be configured to provide the operational state information to the communications module. In some embodiments, receipt of the operational state information indicating an activate state, the communications module 608 may be configured to begin transmitting one or more radio signals via the transmitter(s) 448 of FIG. 4. In some embodiment, the state management module 604 may transmit the user input to the communications module 608 to cause the communications module 608 to begin transmitting one or more radio signals via the transmitter(s) 448 of FIG. 4. As described above, if multiple radio signals are transmitted, each signal may differ in frequency and/or range. The communications module 608 may be configured to provide the state management module 604 feedback indicating that the radio signals are being transmitted. In some embodiments, the state management module 604 may refrain from generating, providing, and/or storing operational state information until it receives feedback from the communications module 608 indicating that the radio signals are being transmitted. Providing the operational state information indicating an activated state to the workspace management module 102 may cause the workspace management module 102 to commence a fault detection process associated with the wearable user device on which the device management module 450 operates. Or in other words, trigger the functionality of the fault detection module 518 of FIG. 5.

In some embodiments, the communications module 608 may be configured to transmit the one or more radio signals via the transmitter(s) 448 according to a predetermined scheme and/or schedule. By way of example, the communications module 608 may cause a first transmitter of the transmitter(s) 448 to transmit one or more radio signals at particular frequencies (e.g., 125 kHz, 925 MHz, 433 MHz, or any suitable combination of the above). The communications module 608 may be configured to exchange information with any suitable number of additional transmitter(s) of a wearable user device (e.g., the wearable user device 414) to exchange any suitable information associated with the transmitter(s). In some embodiments, the communications module 608 may transmit any suitable data to coordinate alternating transmission of the one or more radio signals by multiple transmitter devices. In some embodiments, there may be multiple instances of the communications module 608 in operation. Each instance may correspond to a single transmitter of the transmitter(s) 448 of FIG. 4.

The fault detection module 610 may be configured to monitor transmission of one or more other transmitters of a wearable user device (e.g., the wearable user device 414). By way of example, while another transmitter device is transmitting one or more radio signals, the fault detection module 610 may be configured to monitor the transmissions of the other transmitter device. Should the fault detection module 610 fail to detect one or more of the expected transmissions of the other transmitter device, the fault detection module 610 may be configured to inform the workspace management system that the other transmitter device is faulty (e.g., failing to transmit at least one expected radio signal). It should also be appreciated that fault detection module 610 may be configured to monitor for errors/faults of any suitable component of a transmitter and transmit an indication of such errors/faults to the workspace management system. In some embodiments, there may be multiple instances of the fault detection module 610 in operation. Each instance may correspond to a single transmitter of the transmitter(s) 448 of FIG. 4.

According to some embodiments, the fault detection module 610 and the communications module 608 may exchange any suitable data in order to coordinate transmission and fault monitoring tasks according to any suitable predetermined scheme and/or schedule. By way of example, the communications module 608 may be configured to transmit one or more radio signals for a predetermined period of time. When the period of time has elapsed, the communications module 608 may cease transmitting and may transmit data to the fault detection module 610 to cause the fault detection module 610 to commence monitor one or more other transmitters of the wearable user device 414. The fault detection module 610 may further be configured to monitor for faults of the other transmitters for a predetermined monitoring time period. Upon that time period elapsing, the fault detection module 610 may cease monitoring the other transmitters and may transmit any suitable data to the communications module 608 to cause the communications module 608 to begin another period of transmission. This process may be performed any suitable number of times. It should be appreciated that the fault detection module 610 may monitor for faults of a particular transmitter at any suitable time regardless of whether the transmitter is currently transmitting radio signals or monitoring radio signals transmitted by other transmitter devices.

Upon receipt of an operational state information indicating an activated state, the feedback module 606 may determine a corresponding feedback to be provided via one or more feedback devices of the wearable user device. While the wearable user device operates in an activated state, the feedback module 606 may be configured to provide any suitable feedback via one or more feedback devices of the wearable user device to indicate the activated state. For example, one or more audible beeps corresponding to a power on state may be presented via a speaker of the wearable user device. Additionally, or alternatively, one or more LED lights of one or more feedback devices may present a particular color and/or pattern associated with a activated state (e.g., a solid blue blinking light). Additionally, or alternatively, one or more feedback devices may be utilized present haptic feedback (e.g., a vibration) that indicates the power on state of the wearable user device. The particular strength of the vibration and/or the number and/or pattern of vibrations may be unique to the activated state.

In some embodiments, the state management module 604 may receive user input (e.g., via the input processing module 602) indicating an action to deactivate the wearable user device. In some embodiments, the user input may correspond to the user moving a knob to a position associated with deactivating the wearable user device, although other user input mechanisms may be employed to indicate an action to deactivate the wearable user device. Upon receiving such user input, the state management module 604 may be configured to generate and store operational state information indicating the wearable user device is deactivated. In some embodiments, the state management module 604 may be configured to provide the operational state information indicating a deactivated state to the feedback module 606 and/or a remote system (e.g., the workspace management module 102 of FIGS. 1, 4, and 5).

In some embodiments, the state management module 604 may be configured to provide user input indicating a deactivate action and/or the operational state information to the communications module indicating the deactivated state. Upon receiving such data, the communications module 608 may be configured to cease transmission of one or more radio signals of the transmitter(s) 448 of FIG. 4. In some embodiment, the state management module 604 may transmit to the communications module 608 the user input indicating the action to deactivate to cause the communications module 608 to cease transmission of the one or more radio signals via the transmitter(s) 448. The communications module 608 may be configured to provide the state management module 604 feedback indicating that radio signal transmission has been halted. In some embodiments, the state management module 604 may refrain from generating, providing, and/or storing operational state information indicating a deactivate state until it receives feedback from the communications module 608 indicating that the radio signals are being transmitted. Providing the operational state information indicating a deactivate state to the workspace management module 102 may cause the workspace management module 102 to cease a fault detection process associated with the wearable user device on which the device management module 450 operates. For example, the workspace management module 102, upon receiving operational state information indicating a deactivated state may, among other things, cease monitoring the network connections of the transmitter associated with the wearable user device on which the device management module 450 operates.

Upon receipt of operational state information indicating a deactivated state, the feedback module 606 may determine a corresponding feedback to be provided via one or more feedback devices of the wearable user device. While the wearable user device operates in a deactivated state, the feedback module 606 may be configured to provide any suitable feedback via one or more feedback devices of the wearable user device to indicate the deactivated state.

For example, one or more audible beeps corresponding to a power on state may be presented via a speaker of the wearable user device. Additionally, or alternatively, one or more LED lights of one or more feedback devices may present a particular color and/or pattern associated with a deactivated state (e.g., a relative slow blue blinking light). Additionally, or alternatively, one or more feedback devices may be utilized present haptic feedback (e.g., a vibration) that indicates the deactivated state of the wearable user device. The particular strength of the vibration and/or the number and/or pattern of vibrations may be unique to the deactivated state, although in some embodiment the feedback provided in response to the deactivated state may be the same, or similar to the feedback provided in response to the power on state.

Figure 7:
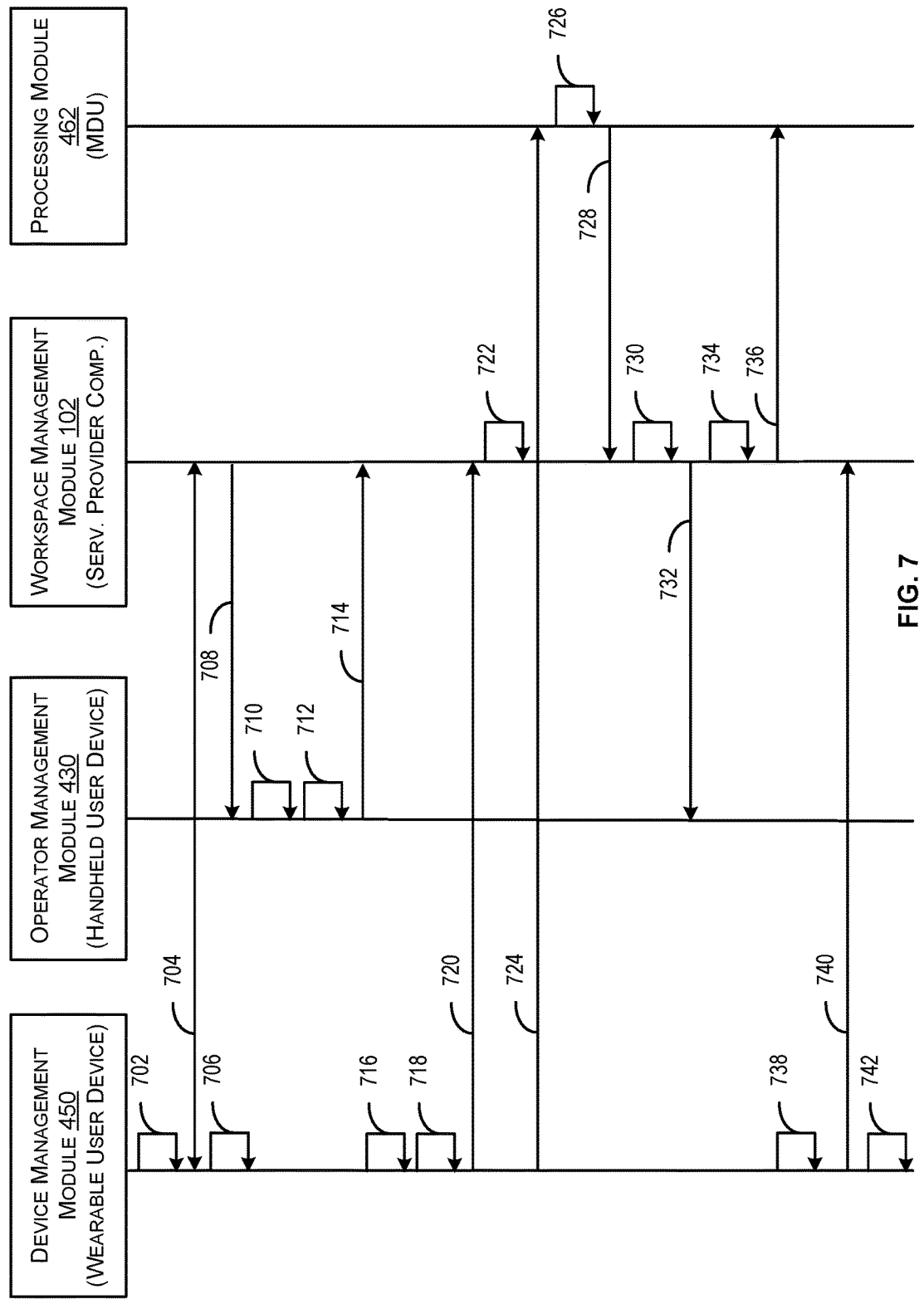
FIG. 7 illustrates an example protocol for interactions performed between components of the inventory management system, in accordance with at least one embodiment.

FIG. 7 illustrates an example protocol 700 for interactions performed between components of the inventory management system, in accordance with at least one embodiment. The protocol 700 may be performed by the device management module 450 of FIGS. 4 and 6 operating at a wearable user device (e.g., the wearable user device 414 of FIG. 4), the operator management module 430 of FIG. 4 operating at a handheld user device (e.g., the handheld user device 412 of FIG. 4), the workspace management module 102 of FIGS. 1, 4, and 5 operating at a service provider computer (e.g., the service provider computer(s) 402 of FIG. 4), and the processing module 462 of FIG. 4 operating at an MDU (e.g., an MDU of the MDU(s) 104 or 404 of FIGS. 1 and 4, respectively).

At step 702, the device management module 450 may receive user input indicating a power on action. As a non-limiting example, the user may utilize a user input device of the wearable user device (e.g., the user input device 202 of FIG. 2) to provide such input. In some embodiments, the user may turn a switch counter-clockwise for a predetermined period of time (e.g., one second, two seconds, etc.) to indicate an action to power on the wearable user device. As described above, upon receiving the user input, the device management module 450 may be configured to transition to a "power on" state and provide feedback via one or more feedback devices (e.g., one or more of the feedback devices 204, 208, 216, 218, and/or 220 of FIG. 2) of the wearable user device to indicate the power on state. For example, one or more audible beeps corresponding to a power on state may be presented via a speaker of the wearable user device. Additionally, or alternatively, one or more LED lights of one or more feedback devices may present a particular color and/or pattern associated with a power on state (e.g., a relatively slow blue blinking light). Additionally, or alternatively, one or more feedback devices may be utilized present haptic feedback (e.g., a vibration) that indicates the power on state of the wearable user device. The particular strength of the vibration and/or the number and/or pattern of vibrations may be unique to the power on state.

At step 704, in response to receiving the user input indicating a power on action and/or transitioning to a power on state, the device management module 450 (e.g., via the communications module 608 of FIG. 6) may be configured to request network credentials from the workspace management module 102. As discussed above, the workspace management module 102 may perform any suitable authentication process for determining whether or not credentials are to be provided to the device management module 450. As a non-limiting example, the wearable user device may include two transmitters, each transmitter operating an instance of the device management module 450. The workspace management module 102 may be configured to receive a network credential request including an alphanumeric identifier for the corresponding transmitter. If the alphanumeric identifier is associated with the wearable user device as indicated in a mapping maintained by the workspace management module 102, the workspace management module 102 may be configured to provide network credentials to the device management module 450.

At step 706, the device management module 450 (e.g., the communications module 608) may utilize the received network credentials to connect to a wireless network associated with the workspace in which the device management module 450 is operating (e.g., the workspace 110 of FIG. 1).

At step 708, the workspace management module 102 may detect that all of the transmitters associated with the wearable user device are connected to the wireless network. Accordingly, the workspace management module 102 may transmit data indicating that the wearable user device is active to the operator management module 430.

At step 710, the operator management module 430 may display a selectable option corresponding to the wearable user device at a graphical user interface. By way of example, the graphical user interface may indicate (e.g., via a pull down menu or otherwise) that the wearable user device is selectable.

At step 712, the operator management module 430 may provide one or more interfaces with which a user may provide a planned path associated with the wearable user device. By way of example, the operator management module 430 may display a map of the workspace 110 of FIG. 1. Any suitable mechanism of the interface may enable the user to draw or otherwise indicate a planned path of traversal associated with the wearable user device.

At step 714, the operator management module 430 may transmit association data indicating an association between the user and the wearable user device (e.g., in response to the determining that the wearable user device was selected) and/or planned path data corresponding to the wearable user device (e.g., in response to receiving the planned path data). It should be appreciated that the workspace management module 102 may be configured to store an association between the user and the wearable user device upon receipt of such information. As discussed above, the workspace management module may be configured to consider the planned path of the wearable user device when determining planned paths for MDUs of the system.

At step 716, the device management module 450 may receive user input indicating an activate action. As a non-limiting example, the user may utilize a user input device of the wearable user device (e.g., the user input device 202 of FIG. 2) to provide such input. In some embodiments, the user may turn a switch clockwise for a predetermined period of time (e.g., one second, two seconds, etc.) to indicate an action to activate the wearable user device.

At step 718, in response to receiving the user input indicating the action to activate the wearable user device, the device management module 450 be configured to cause one or more transmitters (e.g., one or more transmitter(s) 448 managed by the device management module 450) to begin transmitting one or more radio signals. In some embodiments in which multiple transmitters are utilized, one transmitter may transit the one or more radio signals at any given time while the other transmitters perform fault detection operations. The transmitters may take turns transmitting the one or more radio signals according to any suitable predetermined scheme and/or schedule. Upon commencing transmission, the device management module 450 may generate and save operational state information indicating that the wearable user device is in an activated state (e.g., indicating the device is currently transmitting one or more radio signals via one or more of the transmitter(s) 448). At any suitable time (e.g., upon generating operational state information indicating the activated state) the device management module 450 may be configured to provide feedback via one or more feedback devices (e.g., one or more of the feedback devices 204, 208, 216, 218, and/or 220 of FIG. 2) of the wearable user device to indicate the activated state. For example, one or more audible beeps corresponding to an activated state may be presented via a speaker of the wearable user device. Additionally, or alternatively, one or more LED lights of one or more feedback devices may present a particular color and/or pattern associated with the activated state (e.g., a solid blue light). Additionally, or alternatively, one or more feedback devices may be utilized present haptic feedback (e.g., a vibration) that indicates the activated state of the wearable user device. The particular strength of the vibration and/or the number and/or pattern of vibrations may be unique to the activated state. In some embodiments, the device management module 450 may be configured to determine that all transmitters of the wearable user device are transmitting prior to generating and/or transmitting operational state information indicating the wearable user device is operating in an activated state.

At step 720, the device management module 450 may transmit operational state information to the workspace management module 102, the operational state information indicating that the device management module 450 is operating in an activated state. In some embodiments, the device management module 450 may be configured to determine that all transmitters of the wearable user device are transmitting prior to generating and/or transmitting operational state information indicating the wearable user device is operating in an activated state.

At step 722, upon receipt of the operational state information indicating the wearable user device is operating in an activated state, the workspace management module 102 may commence a fault detection process associated with the transmitter(s) of the wearable user device. By way of example only, the workspace management module 102 (e.g., the fault detection module 518) may monitor the network connections (e.g., WiFi) connections corresponding to each of the transmitters.

At step 724, the processing module 462 may determine that a radio signal is being received by a receiver (e.g., the receiver(s) 458 of FIG. 4). The receiver may be configured to receive one or more radio signals transmitted by the wearable user device.

At step 726, the processing module 462 may cause the MDU on which it operates to alter its motion based at least in part on the frequency of the radio signal received at 724. For example, the processing module 462 may cause the MDU to slow and/or stop based on the particular frequency of the received radio signal.

At step 728, the processing module 462 may provide navigational information (e.g., a location, a current speed, etc.), sensor data, and/or operational state information (e.g., indicating the MDU is traveling at a reduced speed or stopped altogether due to the received radio signal).

At step 730, the receipt of this navigational information, sensor data, and/or operational state information may trigger the workspace management module 102 (e.g., the location estimation module 520 of FIG. 5) to estimate a location of the wearable user device.

At step 732, the workspace management module 102 may send the estimate location of the wearable user device to the operator management module 430. Receipt of this information may cause the operator management module 430 to display the estimated location of the wearable user device. It should be appreciated that the estimate location of each operator of a wearable user device may be displayed via a common graphical user interface to enable any user to view the estimated locations of any suitable number of wearable user devices.

At step 734, the workspace management module 102 may detect a lost connection of one or more transmitters of the wearable user device. At 736, the workspace management module 102 may immediately (or after a predetermined time period has elapsed) transmit a stop command to one or more MDUs of the system (e.g., via the processing module 462). Receipt of the stop command by the processing module 462 may cause the MDU on which the processing module 462 operates to halt motion. Although not depicted, should the workspace management module 102 detect that the transmitter(s) regain network connection, the workspace management module 102 may transmit a resume command to the processing module 462 to cause the MDU to resume its activities.

At step 738, the device management module 450 may receive user input indicating a deactivate action. As a non-limiting example, the user may utilize a user input device of the wearable user device (e.g., the user input device 202 of FIG. 2) to provide such input. In some embodiments, the user may turn a switch clockwise for a predetermined period of time (e.g., three seconds, a time period different from the time period associated with the activated state, etc.) to indicate an action to deactivate the wearable user device. In response to receiving the user input indicating the action to deactivate the wearable user device, the device management module 450 be configured to cause one or more transmitters (e.g., one or more transmitter(s) 448 managed by the device management module 450) to cease transmission. At any suitable time, the device management module 450 may be configured to provide feedback via one or more feedback devices (e.g., one or more of the feedback devices 204, 208, 216, 218, and/or 220 of FIG. 2) of the wearable user device to indicate the deactivated state. For example, one or more audible beeps corresponding to a deactivated state may be presented via a speaker of the wearable user device. Additionally, or alternatively, one or more LED lights of one or more feedback devices may present a particular color and/or pattern associated with the activated state (e.g., a slow blue blinking light). Additionally, or alternatively, one or more feedback devices may be utilized present haptic feedback (e.g., a vibration) that indicates the deactivated state of the wearable user device. The particular strength of the vibration and/or the number and/or pattern of vibrations may be unique to the deactivated state. In some embodiments, the device management module 450 may be configured to determine that all transmitters of the wearable user device are transmitting prior to generating and/or transmitting operational state information indicating the wearable user device is operating in a deactivated state.

At step 740, the device management module 450 may transmit operational state information indicating that the wearable user device is in a deactivated state (e.g., indicating the device is not currently transmitting one or more radio signals via the transmitter(s) 448). Receipt of the operational state information may cause the workspace management module 102 (e.g., the fault detection module 510 of FIG. 5) to cease its fault monitoring of the transmitters of the wearable user device. While the wearable user device is operating in a deactivated state, the workspace management module 102 would not detect lost network connections of the transmitters of the wearable user device and thus, would not transmit stop commands related to the wearable user device regardless of whether or not the transmitters had lost network connection. It should be appreciated, that although not depicted, the workspace management module 102 may transmit, at any suitable time, any suitable data indicating the operational state of the wearable user device to the operator management module 430 for display at the handheld user device.

At step 738, the device management module 450 may receive user input indicating a power off action. As a non-limiting example, the user could turn a switch counter-clockwise for 6-10 seconds and release the switch to indicate a power off action. In response to receiving user input indicating a power off action, the device management module 450 may perform any suitable operations for powering off the components of the wearable user device.

Figure 8:
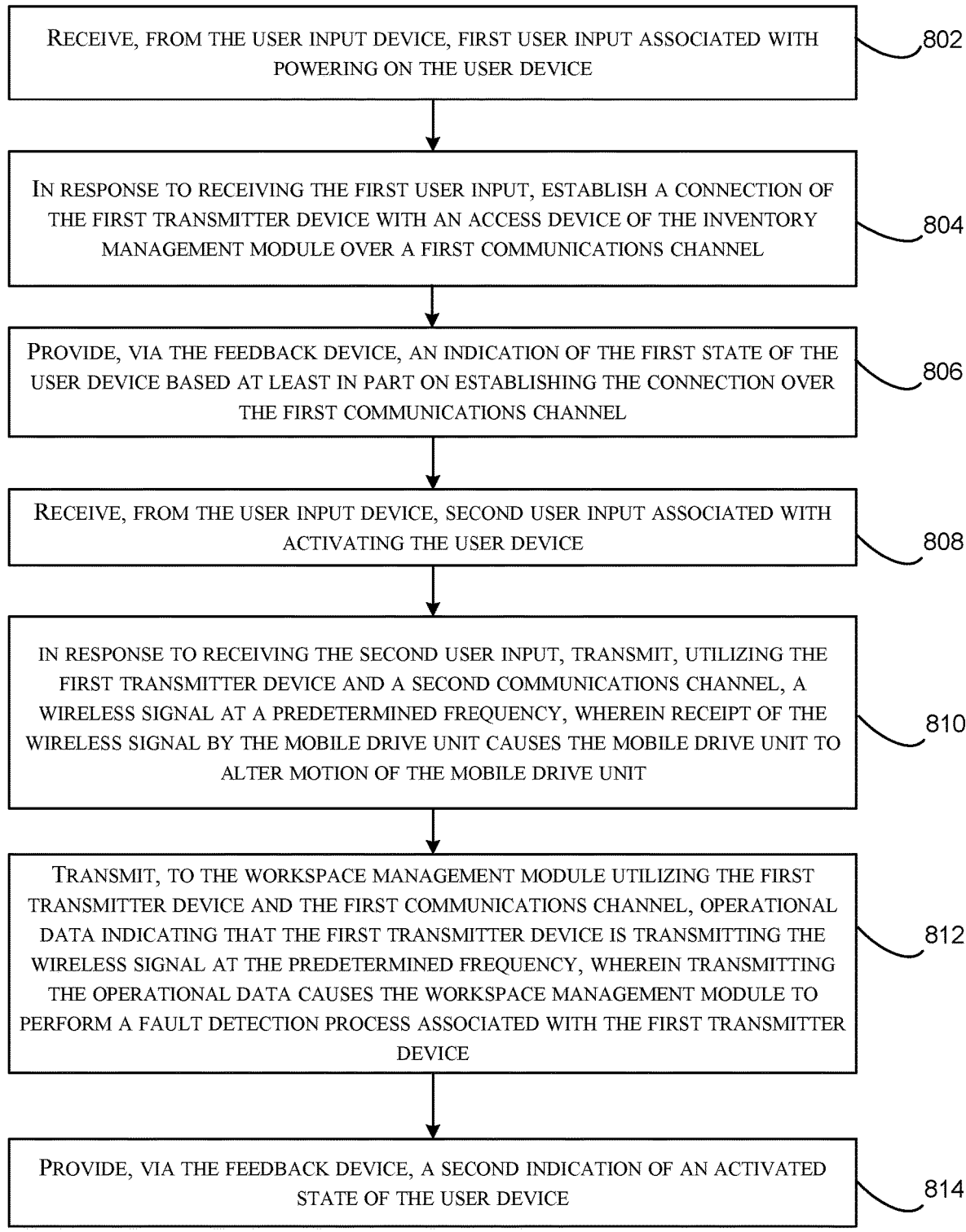
FIG. 8 illustrates a flow diagram of an example method for utilizing various components of an inventory management system, in accordance with at least one embodiment.

FIG. 8 illustrates a flow diagram of an example method 800 for utilizing various components of an inventory management system, in accordance with at least one embodiment. The method 800 may be performed by a user device (e.g., the wearable user device 118 of FIG. 1, the wearable user device 414 of FIG. 4). The operations of method 800 may be performed in any suitable order. In some embodiments, more or fewer operations are contemplated.

In some embodiments, the inventory management system may include a workspace management system configured to manage a plurality of mobile drive units within the inventory management system, a mobile drive unit configured to move within the inventory management system, and a user device. The user device (e.g., the wearable user device 118 of FIG. 1, the user device 200 of FIG. 2, the wearable user device 414 of FIG. 4) may include a feedback device configured to indicate a state (e.g., an operational state such as power on, activated, deactivated, etc.) of the user device, a user input device (e.g., the user input device 202 or component 214 of FIG. 2) configured to receive user input, a first transmitter device configured to communicate via two communications channels (e.g., the transmitter device 206 and/or transmitter device 207 of FIG. 2), and one or more processors and/or memories. In some embodiments, the method 800 may be performed by a device management module (e.g., the device management module 450 of FIGS. 4 and 6).

The method may begin at 802, where first user input associated with powering on the user device may be received (e.g., by the input processing module 602 of FIG. 6) from the user input device. In some embodiments, the first user input may indicate an action (e.g., a particular user input device manipulation, a particular user input, etc.) performed at the user input device that corresponds to a powering on action.

At 804, and in response to receiving the first user input, a connection of the first transmitter device may be established with an access device of the inventory management system over a first communications channel. In some embodiments, the access device may be configured to receive and/or transmit wireless communications via a wireless communications protocol (e.g., 802.11, Bluetooth®, Bluetooth Low Energy®, etc.).

At 806, an indication of the first state (e.g., an operational state corresponding to "power on") of the user device may be provided via the feedback device (e.g., any combination of the feedback devices 204, 208, 216, 218, and/or 220) based at least in part on establishing the connection over the first communications channel.

At 808, second user input associated with activating the user device may be received from the user input device. In some embodiments, the second user input may indicate an action (e.g., a particular user input device manipulation, a particular user input, etc.) performed at the user input device that corresponds to an activating action.

At 810, in response to receiving the second user input, a wireless signal may be transmitted utilizing the first transmitter device and a second communications channel (e.g., a ultra-wide band radio protocol). The wireless signal may have at a predetermined frequency. In some embodiments, receipt of the wireless signal by a mobile drive unit may cause the mobile drive unit to alter motion of the mobile drive unit;

At 812, operational data indicating that the first transmitter device is transmitting the wireless signal at the predetermined frequency may be transmitted to the workspace management module utilizing the first transmitter device and the first communications channel (e.g., Wi-Fi). In some embodiments, transmitting the operational data may cause the workspace management module to perform a fault detection process associated with the first transmitter device.

At 814, a second indication of an activated state of the user device may be provided via the feedback device (e.g., any combination of the feedback devices 204, 208, 216, 218, and/or 220).

Figure 9:
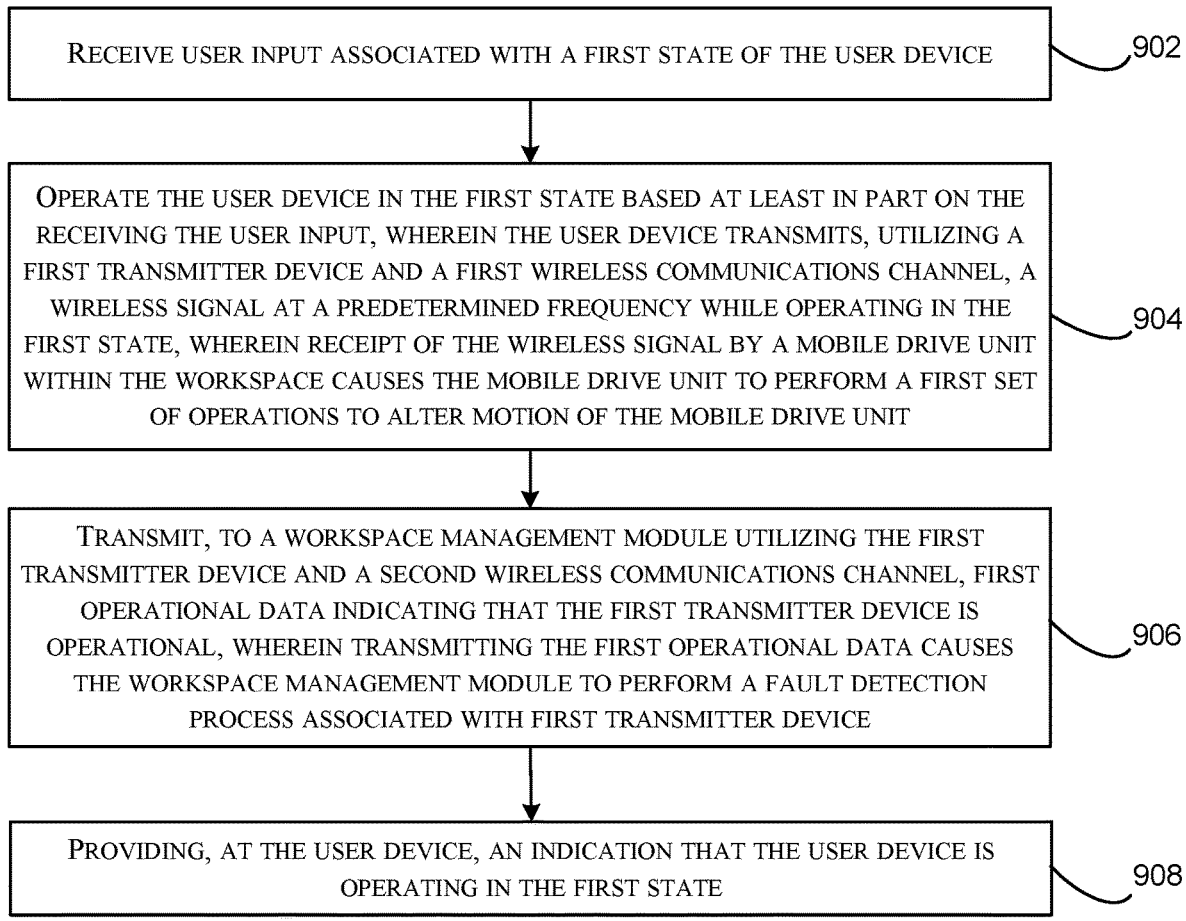
FIG. 9 illustrates a flow diagram of another example method for utilizing various components of an inventory management system, in accordance with at least one embodiment.

FIG. 9 illustrates a flow diagram of another example method for utilizing various components of an inventory management system, in accordance with at least one embodiment; The method 900 may be performed by a user device (e.g., the wearable user device 118 of FIG. 1, the wearable user device 414 of FIG. 4) utilizing components of the user device (e.g., the components of the wearable user device 414 including the device management module 450). The operations of method 900 may be performed in any suitable order. In some embodiments, more or fewer operations are contemplated.

The method may begin at 902, where user input associated with a first state of the user device may be received (e.g., via the input processing module 602 of FIG. 6). By way of example, a user input device (e.g., the user input device 202 of FIG. 2) may be manipulated and/or utilized to collect user input. For example, the user input device may comprise a rotatable switch that may be manipulated in a manner as to indicate an activate action.

At 904, the user device may operate in the first state based at least in part on the receiving the user input. While operating in the first state (e.g., an activated state) the user device may transmit, utilizing a first transmitter device (e.g., the transmitter device 206 or 208 of FIG. 2) and a first wireless communications channel (e.g., a radio channel), a wireless signal at a predetermined frequency. In some embodiments, receipt of the wireless signal by a mobile drive unit within the workspace may cause the mobile drive unit to perform a first set of operations to alter motion of the mobile drive unit. By way of example, the mobile drive unit may be configured to slow or stop based at least in part on receiving the wireless signal.

At 906, first operational data indicating that the first transmitter device is operational may be transmitted to a workspace management module (e.g., the workspace management module 102 of FIGS. 1, 4, and 5) utilizing the first transmitter device and a second wireless communications channel (e.g., WiFi). In some embodiments, transmitting the first operational data may cause the workspace management module to perform a fault detection process associated with first transmitter device.

At 908, an indication that the user device is operating in the first state may be provided at the user device (e.g., via one or more feedback devices, such as feedback devices 204, 208, 216, 218, 220, or any suitable combination thereof).

Figure 10:
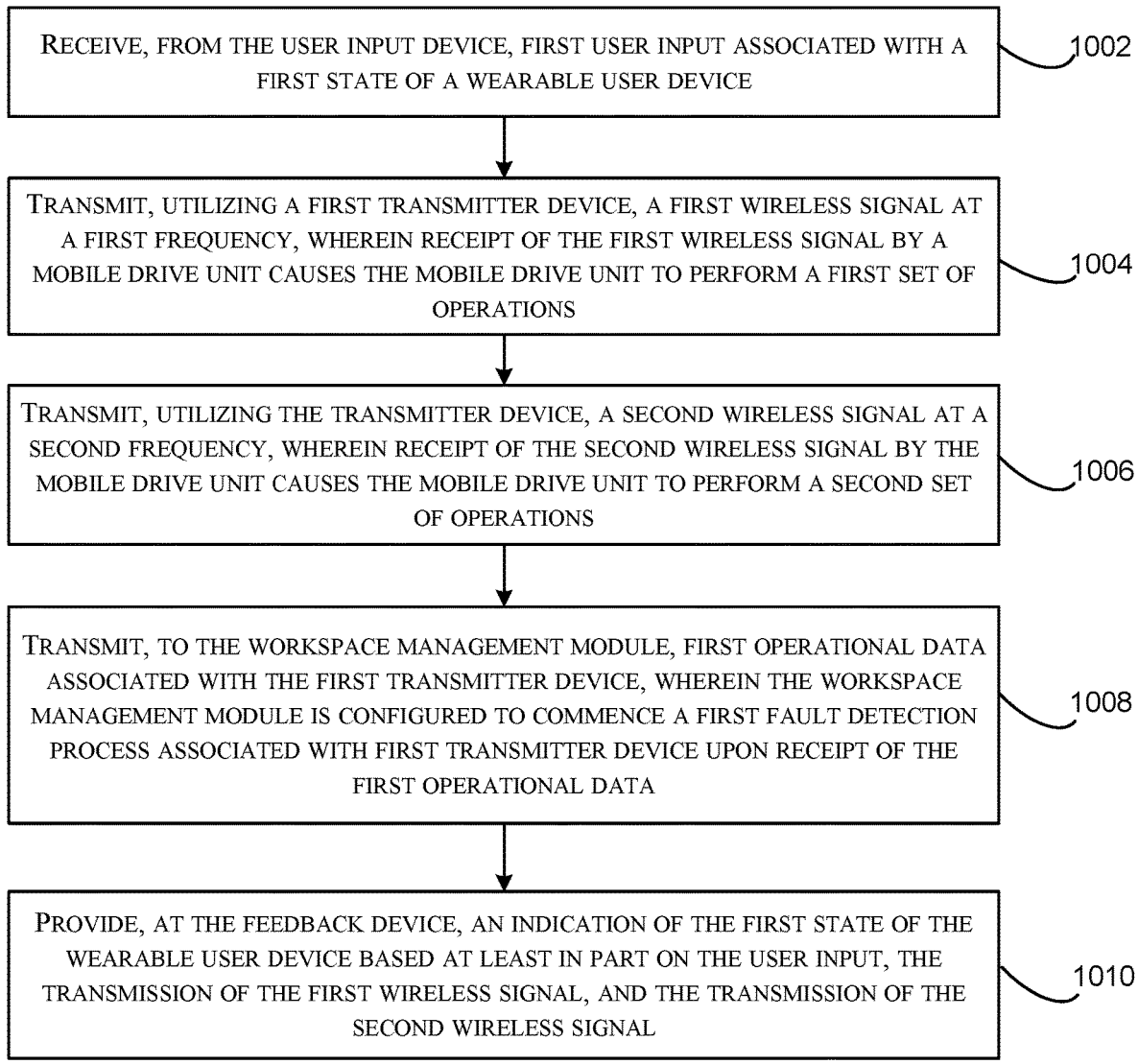
FIG. 10 illustrates a flow diagram of yet another example method for utilizing various components of an inventory management system, in accordance with at least one embodiment.

FIG. 10 illustrates a flow diagram of yet another example method 1000 for utilizing various components of an inventory management system, in accordance with at least one embodiment. The method 1000 may be performed by a user device (e.g., the wearable user device 118 of FIG. 1, the wearable user device 414 of FIG. 4). The operations of method 1000 may be performed in any suitable order. In some embodiments, more or fewer operations are contemplated.

In some embodiments, the inventory management system may include a workspace management system configured to manage a plurality of mobile drive units within the inventory management system, a mobile drive unit configured to move within the inventory management system, and a wearable user device. The wearable user device (e.g., the wearable user device 118 of FIG. 1, the user device 200 of FIG. 2, the wearable user device 414 of FIG. 4) may include a feedback device configured to indicate a state (e.g., an operational state such as power on, activated, deactivated, etc.) of the wearable user device, a user input device (e.g., the user input device 202 or component 214 of FIG. 2) configured to receive user input, and a first transmitter device (e.g., the transmitter device 206 of FIG. 2) configured to transmit one or more wireless signals. In some embodiments, the method 1000 may be performed by one or more device management modules (e.g., the device management module 450 of FIGS. 4 and 6) operating at the wearable user device.

The method may begin at 1002, where user input associated with a first state of the wearable user device may be received (e.g., via the input processing module 602 of FIG. 6). By way of example, a user input device (e.g., the user input device 202 of FIG. 2) may be manipulated and/or utilized to collect user input. For example, the user input device may comprise a rotatable switch that may be manipulated in a manner as to indicate an activate action.

At 1004, a first wireless signal may be transmitted utilizing the first transmitter device. The first wireless signal may be transmitted at a first frequency (e.g., 925 MHz, 433 MHz, etc.). In some embodiments, receipt of the first wireless signal by a mobile drive unit causes the mobile drive unit to perform a first set of operations. By way of example, receiving the first wireless signal may cause the mobile drive unit to slow its speed.

At 1006, a second wireless signal may be transmitted utilizing the first transmitter device. The second wireless signal may be transmitted at a second frequency (e.g., a frequency that is different than the first frequency, such as 125 kHz). In some embodiments, receipt of the second wireless signal by a mobile drive unit causes the mobile drive unit to perform a second set of operations. By way of example, receiving the second wireless signal may cause the mobile drive unit to halt its motion.

At 1008, first operational data associated with the first transmitter device may be transmitted to the workspace management module (e.g., the workspace management module 102). In some embodiments, the workspace management module 102 is configured to commence a first fault detection process associated with first transmitter device upon receipt of the first operational data.

At 1010, an indication that the user device is operating in the first state may be provided at the feedback device (e.g., via one or more feedback devices, such as feedback devices 204, 208, 216, 218, 220, or any suitable combination thereof). The indication may be provided based at least in part on the user input, the transmission of the first wireless signal, and the transmission of the second wireless signal.

It should be appreciated that the user device may further comprise a second transmitter device in addition to the first transmitter device. In some embodiments, the second transmitter device may be configured to transmit the first and second wireless signals at different times than those utilized by the first transmitter device to transmit the first and second wireless signals. Second operational data associated with the second transmitter device may also be transmitted to the workspace management module (e.g., the workspace management module 102). In some embodiments, the workspace management module 102 is configured to commence a second fault detection process associated with second transmitter device upon receipt of the second operational data. It should also be appreciated that each of the first transmitter device and the second transmitter device may be configured to monitor the transmission provided by the other to detect faults in transmission. Should a transmitter device fail to receive an expected transmission by the other, the workspace management module may be notified to cause the workspace management module to perform one or more operations associated with fault detection. For example, the workspace management module may be configured to transmit a stop command immediately upon receiving an indication that one transmitter device failed to receive the transmission expected from another transmitter device.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
a workspace management module configured to manage a plurality of mobile drive units within the inventory management system;
a mobile drive unit configured to move within the inventory management system; and
a user device comprising:
a feedback device configured to indicate a state of the user device;
a user input device configured to receive user input;
a first transmitter device configured to communicate via two communications channels;
a processor; and
one or more memories having thereon computer-executable instructions that, when executed by the processor, cause the user device to:
receive, from the user input device, first user input associated with powering on the user device;
in response to receiving the first user input, establish a connection of the first transmitter device with an access device of the inventory management system over a first communications channel;
provide, via the feedback device, an indication of a first state of the user device based at least in part on establishing the connection over the first communications channel;
receive, from the user input device, second user input associated with activating the user device;
in response to receiving the second user input, transmit, utilizing the first transmitter device and a second communications channel, a wireless signal at a predetermined frequency, wherein receipt of the wireless signal by the mobile drive unit causes the mobile drive unit to alter motion of the mobile drive unit;
transmit, to the workspace management module utilizing the first transmitter device and the first communications channel, operational data indicating that the first transmitter device is transmitting the wireless signal at the predetermined frequency, wherein transmitting the operational data causes the workspace management module to perform a fault detection process associated with the first transmitter device; and
provide, via the feedback device, a second indication of an activated state of the user device.

2. The inventory management system of claim 1, wherein the feedback device presents at least one of: audible feedback, visual feedback, or haptic feedback.

3. The inventory management system of claim 1, wherein the user device is attached to a wearable vest.

4. The inventory management system of claim 1, wherein the user device further comprises a second transmitter device configured to communicate via the two communications channels, and wherein executing the computer-executable instructions further causes the user device to:
in response to receiving the first user input, establish a second connection of the second transmitter device with the access device over the first communications channel, wherein providing the indication of the first state of the user device is further based at least in part on establishing the second connection of the second transmitter device.

5. The inventory management system of claim 1, wherein the fault detection process performed by the workspace management module comprises:
monitoring the connection established for the first transmitter device;
detecting that the connection has been lost;
in response to detecting that the connection has been lost, initiating a timer for a predetermined period of time;
detecting that the timer has elapsed and that the connection has not been restored; and
transmitting, to the plurality of mobile drive units within the workspace, a command to stop, wherein the plurality of mobile drive units are configured to halt motion in response to receiving the command to stop.

6. A computer-implemented method performed by a user device operating within a workspace, comprising:
receiving user input associated with a first state of the user device;
operating the user device in the first state based at least in part on the receiving the user input, wherein the user device transmits, utilizing a first transmitter device and a first wireless communications channel, a wireless signal at a predetermined frequency while operating in the first state, wherein receipt of the wireless signal by a mobile drive unit within the workspace causes the mobile drive unit to alter motion of the mobile drive unit;
transmitting, to a workspace management module utilizing the first transmitter device and a second wireless communications channel, first operational data indicating that the first transmitter device is operational, wherein transmitting the first operational data causes the workspace management module to perform a fault detection process associated with first transmitter device; and
providing, at the user device, an indication that the user device is operating in the first state.

7. The computer-implemented method of claim 6, wherein the user device comprises the first transmitter device and a second transmitter device, wherein the second transmitter device is configured to transmit, while the user device operates in the first state, the wireless signal at the predetermined frequency utilizing the first wireless communications channel, and wherein receipt of the wireless signal by the mobile drive unit within the workspace causes the mobile drive unit to perform a second set of operations to alter motion of the mobile drive unit.

8. The computer-implemented method of claim 7, further comprising:
monitoring, by the second transmitter device, the transmission of the wireless signal by the first transmitter device;
ceasing, by the first transmitter device, the transmission of the wireless signal based at least in part on a predetermined transmission schedule, wherein the second transmitter device commences transmission of the wireless signal based at least in part on the predetermined transmission schedule; and
monitoring, by the first transmitter device, transmission of the wireless signal by the second transmitter device.

9. The computer-implemented method of claim 7, further comprising:
transmitting, to a workspace management module utilizing the second transmitter device and the first wireless communications channel, second operational data indicating that the second transmitter device is operational, wherein transmitting the second operational data causes the workspace management module to perform an additional fault detection process associated with the second transmitter device.

10. The computer-implemented method of claim 7, further comprising:
determining that both the first transmitter device and the second transmitter device are operational, wherein providing the indication of the first state of the user device at the user device is based at least in part on identifying that both the first transmitter device and the second transmitter device are operational.

11. The computer-implemented method of claim 6, wherein the mobile drive unit is further configured to visually indicate, via a visual feedback device of the mobile drive unit, reception of the wireless signal.

12. The computer-implemented method of claim 6, wherein the user device is a wearable article having a front side and a back side, wherein the indication of the first state is provided at the user device via a first device and a second device, wherein the first device is attached to the front side of the wearable article, and wherein the second device is attached to the back side of the wearable article.

13. The computer-implemented method of claim 6, further comprising:
receiving user input associated with a second state of the user device;
operating the user device in a second state based at least in part on the receiving the user input, wherein the user device refrains from transmitting the wireless signal while operating in the second state;
transmitting, to the workspace management module utilizing the first transmitter device and the second wireless communications channel, second operational data indicating that the first transmitter device is in a non-transmission state, wherein transmitting the second operational data causes the workspace management module to suspend the fault detection process associated with first transmitter device; and
providing, at the user device, an indication of the second state of the user device.

14. The computer-implemented method of claim 6, wherein the fault detection process associated with first transmitter device and performed by the workspace management module further comprises:
monitoring a connection of the first transmitter device to the second communications channel; and
transmitting a halt command to the mobile drive unit when the connection is not detected for a period of time.

15. An inventory management system, comprising:
a workspace management module configured to manage movement of a mobile drive unit within the inventory management system;
a mobile drive unit configured to move within a workspace; and
a wearable user device comprising a first transmitter device, a user input device, and a feedback device, wherein the wearable user device is configured to:
receive, from the user input device, user input associated with a first state of the wearable user device;
transmit, utilizing the first transmitter device, a first wireless signal at a first frequency, wherein receipt of the first wireless signal by the mobile drive unit causes the mobile drive unit to perform a first set of operations;
transmit, utilizing the first transmitter device, a second wireless signal at a second frequency, wherein receipt of the second wireless signal by the mobile drive unit causes the mobile drive unit to perform a second set of operations;
transmit, to the workspace management module, first operational data associated with the first transmitter device, wherein the workspace management module is configured to commence a first fault detection process associated with first transmitter device upon receipt of the first operational data; and
provide, at the feedback device, an indication of the first state of the wearable user device based at least in part on the user input, the transmission of the first wireless signal, and the transmission of the second wireless signal.

16. The inventory management system of claim 15, further comprising a portable display device, the portable display device being configured to:
receive, via a graphical user interface, planned path data associated with the wearable user device; and
transmit, to the workspace management module, the planned path data, wherein the workspace management module is configured to utilize the planned path data while managing the movement of the mobile drive unit within the workspace.

17. The inventory management system of claim 15, wherein the inventory management system further comprises a second transmitter device, and wherein the user device is further configured to:
transmit, utilizing the second transmitter device, the first wireless signal at the first frequency;
transmit, utilizing the second transmitter device, the second wireless signal at the second frequency; and
transmit, to the workspace management module, second operational data associated with the second transmitter device, wherein the workspace management module is configured to commence a second fault detection process associated with second transmitter device upon receipt of the second operational data.

18. The inventory management system of claim 15, wherein the first transmitter device and the second transmitter device alternate transmission of the first wireless signal and the second wireless signal such that the first transmitter device transmits the first wireless signal and the second wireless signals at different times than the second transmitter device transmits the first wireless signal and the second wireless signal.

19. The inventory management system of claim 15, wherein the first wireless signal at the first frequency has a first range of a first distance, and wherein the second wireless signal at the second frequency has a second range of a second distance.

20. The inventory management system of claim 17, wherein the user device is configured to:
receive, from the user input device, subsequent user input associated with a second state of the wearable user device;
cease transmission of the first wireless signal and the second wireless signal based at least in part on receiving the subsequent user input;
transmit, to the workspace management module, subsequent operational data indicating transmission of the first wireless signal and the second wireless signal have ceased, wherein the workspace management module is configured to suspend the first fault detection process and the second fault detection process upon receipt of the subsequent operational data; and provide, at the feedback device, an indication of the second state of the wearable user device.

\* \* \* \* \*